US012438667B2

(12) United States Patent
He

(10) Patent No.: US 12,438,667 B2
(45) Date of Patent: Oct. 7, 2025

(54) WIRELESS COMMUNICATION METHOD, TERMINAL DEVICE, AND NETWORK DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 408 days.

(21) Appl. No.: 17/987,532

(22) Filed: Nov. 15, 2022

(65) Prior Publication Data
US 2023/0077947 A1 Mar. 16, 2023

Related U.S. Application Data

(63) Continuation of application No. PCT/CN2020/090707, filed on May 15, 2020.

(51) Int. Cl.
 *H04L 5/00* (2006.01)
 *H04W 72/04* (2023.01)
 *H04W 72/0446* (2023.01)
 *H04W 72/0453* (2023.01)

(52) U.S. Cl.
 CPC ....... *H04L 5/0051* (2013.01); *H04W 72/0446* (2013.01); *H04W 72/0453* (2013.01)

(58) Field of Classification Search
 CPC ... H04L 5/0051; H04L 5/0053; H04L 5/0094; H04W 72/04; H04W 72/0453; H04W 72/0446
 See application file for complete search history.

(56) References Cited

U.S. PATENT DOCUMENTS

| 2020/0015222 | A1  | 1/2020 | Huang et al. |           |
|--------------|-----|--------|--------------|-----------|
| 2020/0187225 | A1* | 6/2020 | Xia          | H04L 5/0051 |
| 2021/0212036 | A1* | 7/2021 | Wu           | H04L 5/0053 |
| 2021/0297221 | A1* | 9/2021 | Lee          | H04L 5/0053 |

(Continued)

FOREIGN PATENT DOCUMENTS

| CN | 101860425 A | 10/2010 |
|----|-------------|---------|
| CN | 110535584 A | 12/2019 |

(Continued)

OTHER PUBLICATIONS

Extended European search report of counterpart European application No. 20935597.3 issued on Mar. 14, 2024.
Communication pursuant to Rule 164(1) EPC for European application 20935597.3 mailed Dec. 21, 2023.
International Search Report and Written Opinion dated Feb. 18, 2021 in International Application No. PCT/ CN2020/090707. English translation attached.

(Continued)

*Primary Examiner* — Brian D Nguyen
(74) *Attorney, Agent, or Firm* — Sheppard, Mullin, Richter &Hampton LLP

(57) ABSTRACT

The embodiments of the present disclosure provide a wireless communication method, a terminal device, and a network device, capable of obtaining time-domain relative positions and/or frequency-domain relative positions of a DMRS on repetitive transmissions of a data channel in a scenario of repetitive transmissions of the data channel. The time-domain relative positions and/or the frequency-domain relative positions of the reference signal on at least two transmissions in the repetitive transmissions are different.

16 Claims, 15 Drawing Sheets

(56) References Cited

U.S. PATENT DOCUMENTS

| | | | | |
|---|---|---|---|---|
| 2022/0200759 A1* | 6/2022 | Yoshioka | .............. | H04L 5/0007 |
| 2022/0224481 A1* | 7/2022 | Yu | ...................... | H04L 25/0232 |
| 2023/0091216 A1* | 3/2023 | Yamamoto | ................ | H04L 1/08 |
| | | | | 370/329 |
| 2023/0122786 A1* | 4/2023 | Bang | ..................... | H04W 72/23 |
| | | | | 370/329 |
| 2023/0155744 A1* | 5/2023 | Bae | ...................... | H04L 1/1864 |
| | | | | 370/280 |
| 2023/0232313 A1* | 7/2023 | Ji | .......................... | H04B 7/063 |
| | | | | 370/329 |
| 2024/0073887 A1* | 2/2024 | Bae | .................... | H04W 72/535 |

FOREIGN PATENT DOCUMENTS

| | | | | |
|---|---|---|---|---|
| EP | 3537747 A1 * | 9/2019 | .............. | H04L 1/00 |
| EP | 3968711 A1 * | 3/2022 | .............. | H04L 1/08 |
| WO | 2020067967 A1 | 4/2020 | | |

OTHER PUBLICATIONS

Sony. "On DMRS of segmented PUSCH", 3GPP TSG RAN WG1 #100 R1-2000585, Mar. 6, 2020 (Mar. 6, 2020), section 2.
OPPO. "PUSCH enhancement for URLLC", 3GPP TSG RAN WG1 #98bis R1-1910621, Oct. 20, 2019 (Oct. 20, 2019), entire document.

* cited by examiner

WIRELESS COMMUNICATION METHOD, TERMINAL DEVICE, AND NETWORK DEVICE

CROSS-REFERENCE TO RELATED APPLICATIONS

The present application is a continuation of International Application No. PCT/CN2020/090707, filed on May 15, 2020, the entire disclosure of which is incorporated herein by reference.

TECHNICAL FIELD

Embodiments of the present disclosure relate to communication technology, and more particularly, to a wireless communication method, a terminal device, and a network device.

BACKGROUND

The New Radio (NR) system is mainly designed to support Enhanced Mobile Broadband (eMBB) services. Its main technology is to meet the needs of high rate, high spectral efficiency and large bandwidth. In fact, in addition to eMBB services, there are many different types of services, such as sensor networks, video surveillance, wearables, etc., which have different requirements from eMBB services in terms of rate, bandwidth, power consumption, and cost. The capabilities of terminals supporting these services are reduced compared to those supporting eMBB, such as reduced supported bandwidth, relaxed processing time, and reduced number of antennas. Therefore, it is desired to adopt certain technologies such that the NR system can support operations of such terminals with lower capabilities.

Based on this, it is considered to introduce repetitive transmissions of data channels such as Physical Downlink Shared Channel (PDSCH) and Physical Uplink Shared Channel (PUSCH) in the NR system to achieve enhanced coverage of the data channels. Typically, these data channels carry Demodulation Reference Signal (DMRS) transmissions. Thus, it is a technical problem to be solved in the present disclosure to determine the time domain and/or frequency domain position of the DMRS in the repetitive transmissions of the data channel.

SUMMARY

Embodiments of the present disclosure provide a wireless communication method, a terminal device, and a network device. Thereby, the time domain and/or frequency domain position of the DMRS in the repetitive transmissions of the data channel can be determined.

In a first aspect, a wireless communication method is provided. The method includes: obtaining, by a terminal device, time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

In a second aspect, a wireless communication method is provided. The method includes: obtaining, by a network device, time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

In a third aspect, a terminal device is provided. The terminal device is configured to perform the method according to the above first aspect or any implementation thereof.

In particular, the terminal device includes one or more functional modules configured to perform the method according to the above first aspect or any implementation thereof.

In a fourth aspect, a network device is provided. The network device is configured to perform the method according to the above second aspect or any implementation thereof.

In particular, the network device includes one or more functional modules configured to perform the method according to the above second aspect or any implementation thereof.

In a fifth aspect, a terminal device is provided. The terminal device includes a processor and a memory. The memory is configured to store a computer program, and the processor is configured to invoke and execute the computer program stored in the memory to perform the method according to the above first aspect or any implementation thereof.

In a sixth aspect, a network device is provided. The network device includes a processor and a memory. The memory is configured to store a computer program, and the processor is configured to invoke and execute the computer program stored in the memory to perform the method according to the above second aspect or any implementation thereof.

In a seventh aspect, an apparatus is provided. The apparatus is configured to perform the method according to the above first or second aspect or any implementation thereof.

In particular, the apparatus includes a processor configured to invoke and execute a computer program from a memory, to enable a device provided with the apparatus to perform the method according to the above first or second aspect or any implementation thereof.

In an eighth aspect, a computer-readable storage medium is provided. The computer-readable storage medium is configured to store a computer program that enables a computer to perform the method according to the above first or second aspect or any implementation thereof.

In a ninth aspect, a computer program product is provided. The computer program product includes computer program instructions that cause a computer to perform the method according to the above first or second aspect or any implementation thereof.

In a tenth aspect, a computer program is provided. The computer program, when executed on a computer, causes the computer to perform the method according to the above first or second aspect or any implementation thereof.

With the technical solution of the first aspect or the second aspect, the present disclosure provides a method for obtaining time-domain relative positions and/or frequency-domain relative positions of a DMRS on repetitive transmissions of a data channel in a scenario of repetitive transmissions of the data channel. Further, between different repetitive transmissions of the data channel, the time-domain relative positions where the DMRS is located are different among relative time-domain resource positions in time-domain resources of the data channel, and/or the frequency-domain relative positions where the DMRS is located are different among relative frequency-domain resource positions in frequency-domain resources of the data channel. This provides as many relative positions of the DMRS as possible in the time-domain and/or frequency-domain resources of the data channel, which facilitates performing channel estimation on more relative time-domain and/or frequency-domain resources to improve demodulation performance of the data channel.

DESCRIPTION OF EMBODIMENTS

The technical solutions in the embodiments of the present disclosure will be described below with reference to the figures in the embodiments of the present disclosure. Obviously, the described embodiments are only some embodiments, rather than all embodiments, of the present disclosure. All other embodiments obtained by those skilled in the art based on the embodiments in the present disclosure without inventive efforts are to be encompassed by the scope of the present disclosure.

The embodiments of the present disclosure can be applied to various communication systems, including for example: Global System of Mobile Communication (GSM), Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolved NR system, LTE-based access to unlicensed spectrum (LTE-U) system, NR-based access to unlicensed spectrum (NR-U) system, Universal Mobile Telecommunication System (UMTS), Wireless Local Area Networks (WLAN), Wireless Fidelity (WiFi), the next generation communication system, or other communication systems.

Generally, traditional communication systems can support a limited number of connections and are easy to implement. However, with the development of communication technology, mobile communication systems will support not only traditional communication, but also e.g., Device to Device (D2D) communication, Machine to Machine (M2M) communication, and Machine Type Communication (MTC), Vehicle to Vehicle (V2V) communication, etc. The embodiments of the present disclosure can also be applied to these communication systems.

Optionally, the communication system of an embodiment of the present disclosure may be applied to a Carrier Aggregation (CA) scenario, a Dual Connectivity (DC) scenario, a Standalone (SA) network deployment scenario, and the like.

Optionally, the embodiments of the present disclosure are not limited to any specific spectrum. For example, the embodiments of the present disclosure may be applied to licensed spectrum or unlicensed spectrum.

Figure 1:
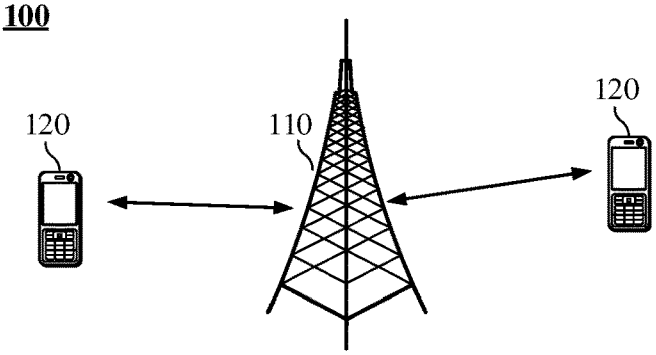
FIG. 1 is a schematic diagram showing a communication system architecture according to an embodiment of the present disclosure.

Exemplarily, a communication system 100 in which an embodiment of the present disclosure can be applied is schematically shown in FIG. 1. The communication system 100 may include a network device 110, which may be a device that communicates with a terminal device 120 (or referred to as a communication terminal or terminal). The network device 110 may provide communication coverage for a particular geographic area, and may communicate with terminal devices located within the coverage.

FIG. 1 exemplarily shows one network device and two terminal devices. Alternatively, the communication system may include multiple network devices, and the coverage of each network device may include other numbers of terminal devices. The embodiment of the present disclosure is not limited to this.

Optionally, the communication system 1000 1 may also include other network entities such as a network controller or a Mobility Management Entity (MME). The embodiment of the present disclosure is not limited to this.

It can be appreciated that, in the embodiments of the present disclosure, a device having a communication function in a network/system may be referred to as a communication device. Taking the communication system 100 shown in FIG. 1 as an example, the communication devices may include the network device 110 and the terminal devices 120 with a communication function. The network device 110 and the terminal device 120 may be the specific devices described above, and details thereof will be omitted here. The communication devices may also include other devices in the communication system 100, e.g., other network entities such as a network controller, an MME, etc., and the embodiment of the present disclosure is not limited to any of these examples.

In addition, the terms "system" and "network" may often be used interchangeably herein. The term "and/or" as used herein only represents a relationship between correlated objects, including three relationships. For example, "A and/or B" may mean A only, B only, or both A and B. In addition, the symbol "/" as used herein represents an "or" relationship between the correlated objects preceding and succeeding the symbol.

The embodiments of the present disclosure are described in conjunction with a network device and a terminal device. The terminal device may refer to a User Equipment (UE), an access terminal, a user unit, a user station, a mobile station, a mobile platform, a remote station, a remote terminal, a mobile device, a user terminal, a terminal, a wireless communication device, a user agent, or a user device. The terminal device may be a station (ST) in a WLAN, a cellular phone, a cordless phone, a Session Initiation Protocol (SIP) phone, a Wireless Local Loop (WLL) station, a Personal Digital Assistant (PDA) device, a handheld device or a computing device having a wireless communication function, another processing device connected to a wireless modem, a vehicle-mounted device, a wearable device, a terminal device in the next generation communication system (e.g., NR network), or a terminal device in a future evolved Public Land Mobile Network (PLMN), etc.

As non-limiting examples, in an embodiment of the present disclosure, the terminal device may also be a wearable device. The wearable device, also known as wearable smart device, is a general term for wearable devices that are intelligently designed and developed from everyday wear, such as glasses, gloves, watches, clothes, and shoes, by applying wearable technologies. A wearable device is a portable device that can be directly worn on or integrated into a user's clothes or accessories. A wearable device is not only a kind of hardware device, but can also provide powerful functions based on software support, data interaction, and cloud interaction. In a broad sense, wearable smart devices may include full-featured, large-sized devices that can provide full or partial functions without relying on smart phones, such as smart watches or smart glasses, and devices that only focus on a certain type of application function and need to cooperate with other devices such as smart phones for use, such as various smart bracelets and smart jewelries for physical sign monitoring.

The network device may be a device communicating with mobile devices. The network device may be an Access Point (AP) in a WLAN, a base station such as Base Transceiver Station (BTS) in a GSM system or a CDMA system, a base station such as NodeB (NB) in a WCDMA system, a base station such as Evolutional Node (eNB or eNodeB) in an LTE system, or a relay station, an access point, a vehicle-mounted device, a wearable device, a network device or base station (e.g., gNB) in an NR network, or a network device in a future evolved PLMN.

In the embodiment of the present disclosure, the network device may provide services for a cell, and the terminal device may communicate with the network device over transmission resources, e.g., frequency domain resources or frequency spectral resources, used in the cell. The cell may be a cell corresponding to the network device (e.g., base station). The cell may belong to a macro base station or a base station corresponding to a small cell. The small cell here may include a metro cell, a micro cell, a pico cell, a femto cell, or the like. These small cells have characteristics such as small coverage and low transmission power, and are suitable for providing high-rate data transmission services.

Before introducing the technical solutions of the present disclosure, the following describes how to determine a time/frequency domain position of a DMRS in a single transmission of a data channel in an NR system.

Downlink Data Transmission in the NR System:

When a network device schedules a downlink data transmission using Downlink Control Information (DCI) for a downlink grant (DL grant), such as DCI format 1_0 or DCI format 1_1, it will carry PDSCH scheduling information in the DCI, including time-domain and frequency-domain resource allocation information. The time-domain resource allocation information is indicated by a Time Domain Resource Allocation (TDRA) field, which contains 4 bits, capable of indicating 16 different rows in a resource allocation table, with each row including a different resource allocation combination. For example, the resource allocation combination includes: a start symbol S, a length L and k0 of a PDSCH and a different type. Here, k0 represents a slot offset between a slot where the DCI is located and a slot where the PDSCH is located. In the NR system, the start symbol S and length L of the PDSCH are no longer fixed, but as described above, the start symbol S and length L are indicated by the TDRA in the DCI. The values of S and L are not arbitrary, but are jointly encoded to form a start and length indicator (SLIV). The range of selectable values is shown in Table 1:

TABLE 1

| PDSCH type | Normal cyclic prefix | | | Extended cyclic prefix | | |
|---|---|---|---|---|---|---|
| mapping | S | L | S + L | S | L | S + L |
| Type A | {0, 1, 2, 3} (Note 1) | {3, . . . ,14} | {3, . . . , 14} | {0, 1, 2, 3} (Note 1) | {3, . . . , 12} | {3, . . . , 12} |
| Type B | {0, . . . , 12} | {2, 4, 7} | {2, . . . , 14} | {0, . . . , 10} | {2, 4, 6} | {2, . . . , 12} |

(Note 1):
S = 3 is applicable only if dmrs-TypeA-Position = 3

Here, for the PDSCH mapping type in Table 1, there are two types of time-domain resource allocation: Type A and Type B. Generally, the difference between Type A and Type B is that the value ranges of the S and L candidate values corresponding to the two types are different. Type A is mainly for slot-based services, S is relatively front-positioned, and L is relatively long. Type B is mainly for Ultra-Reliable and Low Latency Communication (URLLC) services, which have higher delay requirements, so the position of S is more flexible to transmit URLLC services that could arrive at any time, and L is shorter for reducing the transmission delay.

Table 2 is a default table A corresponding to the TDRA indication field. When a terminal device receives the DCI and obtains the TDRA information, it determines the SLIV corresponding to the TDRA according to the default table A.

TABLE 2

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

There are two types of frequency-domain resource allocation for PDSCH: Type0 and Type1.

The Type0 frequency-domain resource allocation introduces a Resource Block Group (RBG). In short, an RBG is composed of a number of RBs. Here, the number of RBs included in one RGB depends on a Radio Resource Control (RRC) configuration and a Bandwidth Part (BWP) size. Here, the RRC configuration includes: Configuration 1 and Configuration 2. For example, the number of RBs included in the RBG can be determined from Table 3.

TABLE 3

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

Assuming that the BWP size is 14 RBs and the RRC configuration for the RBG is Configuration 1, by looking up Table 3, it can be determined that the number of RBs included in one RBG is 2.

Figure 2:
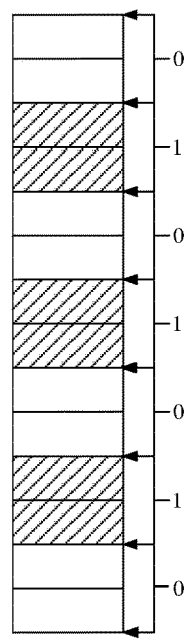
FIG. 2 is a schematic diagram showing frequency-domain resource allocation for PDSCH according to an embodiment of the present disclosure.

Further, each RBG corresponds to 1 bit. If the 1 bit corresponding to a certain RBG is set to 1, it means that the RBG is allocated to a PDSCH. If the 1 bit corresponding to a certain RBG is set to 0, it means that the RBG is not allocated to a PDSCH. FIG. 2 is a schematic diagram showing frequency-domain resource allocation for PDSCH according to an embodiment of the present disclosure. As shown in FIG. 2, the frequency domain resource (RBG) allocation of PDSCH may be represented by "0101010".

Figure 3:
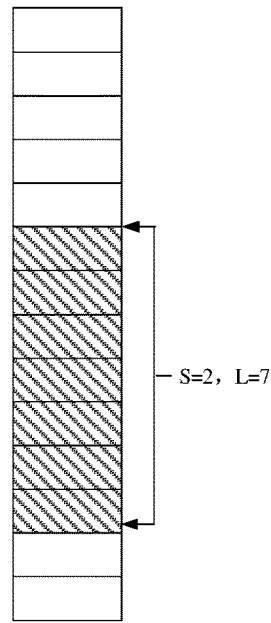
FIG. 3 is a schematic diagram showing frequency-domain resource allocation for PDSCH according to another embodiment of the present disclosure.

The Type1 frequency-domain resource allocation jointly encodes the start position S and the length L of the resource to form a Resource Indication Value (RIV). A group of (S, L) corresponds to a RIV value in a one-to-one manner, and the terminal device can derive the corresponding (S, L) from the RIV value. FIG. 3 is a schematic diagram showing frequency-domain resource allocation for PDSCH according to another embodiment of the present disclosure. As shown in FIG. 3, assuming that the terminal device obtains S=2 and L=7 according to the RIV value, the corresponding start RB is the RB indexed or numbered as 2 and it occupies 7 consecutive RBs thereafter.

The PDSCH transmission includes transmission of a DMRS for the terminal device to demodulate the PDSCH. The time-frequency resource of the DMRS is located within the range of the scheduled resource for the PDSCH. Here, the time-frequency domain resource position of the DMRS is configured by higher layer parameters.

The following describes a method for determining a time-frequency domain resource position of a DMRS in a single transmission:

The DMRS includes a front loaded DMRS, or the DMRS includes a front loaded DMRS and an additional DMRS.

The time-domain position of the front loaded DMRS depends on the PDSCH mapping type. For PDSCH mapping type A, the time domain position of the front loaded DMRS is determined by a higher layer parameter dmrs-TypeA-Position, where dmrs-TypeA-Position='pos2' or 'pos3', with dmrs-TypeA-Position='pos2' indicating the position of the first symbol of the front loaded DMRS $l_0=2$, and dmrs-TypeA-Position='pos3 indicating the position of the first symbol of the front loaded DMRS $l_0=3$, where the reference point of l is the start symbol of the time slot occupied by the PDSCH. For PDSCH mapping type B, the position of the first symbol of the front loaded DMRS is $l_0=0$, and the reference point of l is the start symbol of the scheduled PDSCH. Further, for the front loaded DMRS, it is also divided into two types: single-symbol and double-symbol, representing the number of symbols contained in the DMRS being one or two. If the higher layer parameter maxLength is not configured, the DMRS is of the single-symbol type. If the higher layer parameter maxLength is configured, it is determined whether it is of the single-symbol type or the double-symbol time based on a DCI indication received by the terminal device.

The time-domain position of the additional DMRS is configured by a higher layer parameter dmrs-AdditionalPosition. When dmrs-AdditionalPosition is not configured, the time-domain position of the additional DMRS=pos2. When dmrs-AdditionalPosition is configured, dmrs-AdditionalPosition may indicate the position of the additional DMRS=one of [pos0, pos1, pos3].

Figure 4:
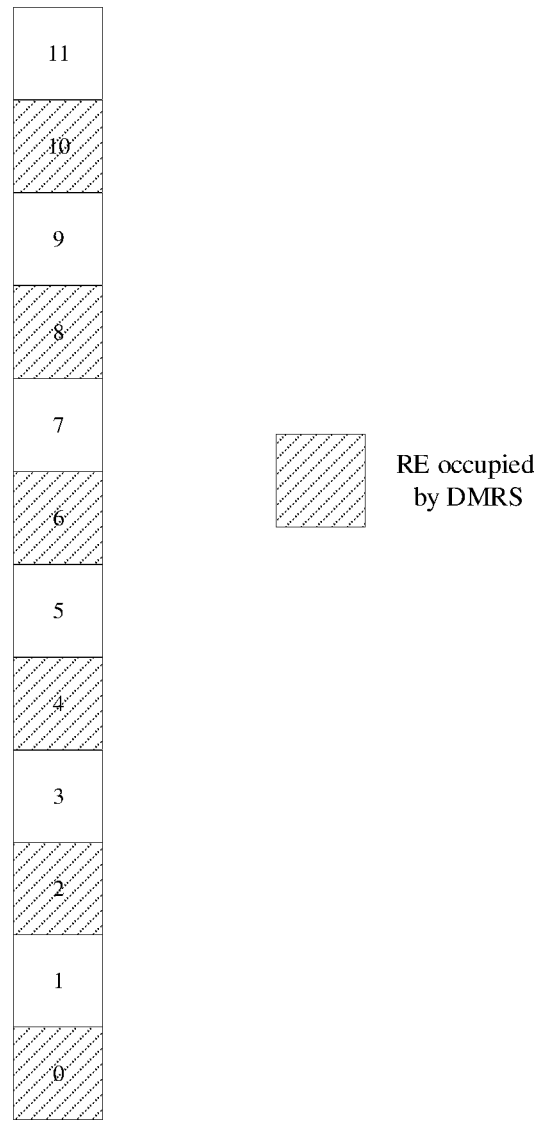
FIG. 4 is a schematic diagram showing frequency-domain resource allocation for DMRS according to an embodiment of the present disclosure.

The determination of the frequency-domain resource position of the DMRS is determined according to a higher layer parameter dmrs-Type, which includes DMRS configuration type 1 and DMRS configuration type 2. FIG. 4 is a schematic diagram showing frequency-domain resource allocation for DMRS according to an embodiment of the present disclosure. As shown in FIG. 4, for DMRS configuration type 1, one DMRS is distributed every other Resource Element (RE) in the frequency domain.

Figure 5:
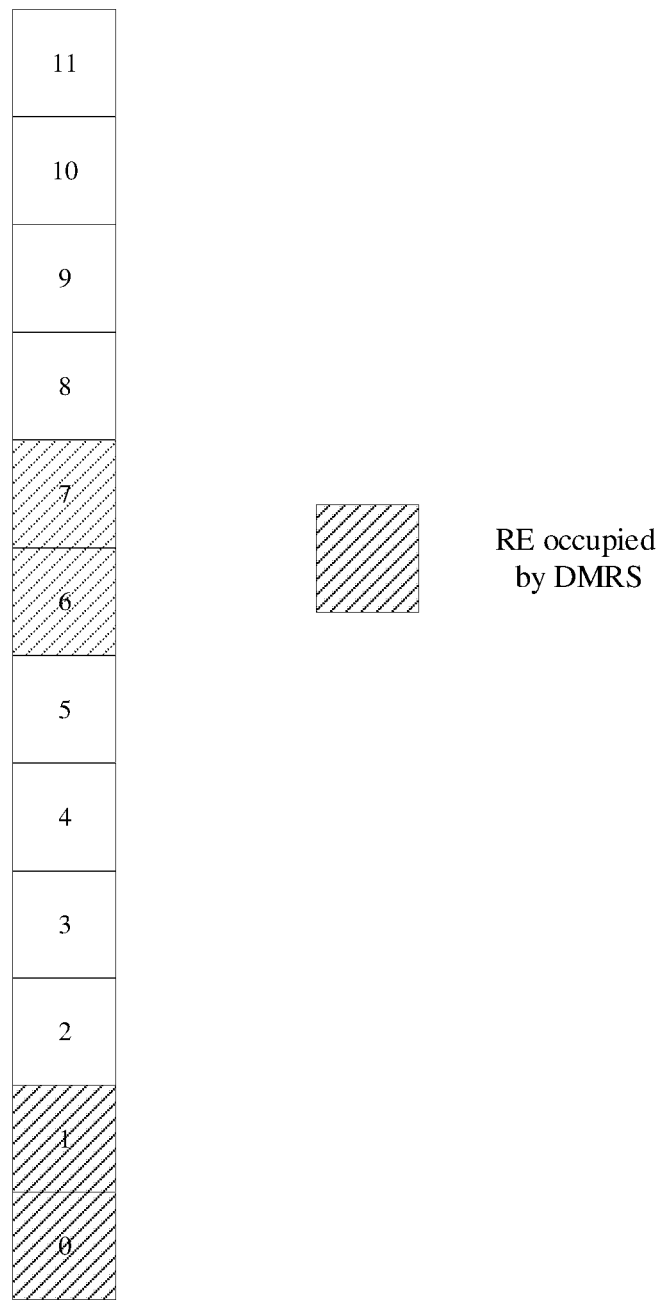
FIG. 5 is a schematic diagram showing frequency-domain resource allocation for DMRS according to another embodiment of the present disclosure.

FIG. 5 is a schematic diagram showing frequency-domain resource allocation for DMRS according to another embodiment of the present disclosure. As shown in FIG. 5, for DMRS configuration type 2, an RE group where the DMRS is located includes two consecutive REs, and RE groups are separated by 6 RE.

Uplink Data Transmission in NR System:

In the NR system, a network device transmits an uplink grant (UL grant), such as DCI format 0_0 or DCI format 0_1, to schedule a PUSCH transmission. Here, when the network device schedules an uplink data transmission via the DCI for the UL grant, it will include a TDRA in the DCI. The TDRA is 4 bits in length, and can indicate 16 different rows in a resource allocation table, and each row contains a different resource allocation combination of e.g., a start position S, a length L, k2, and a different type of PUSCH. Here, k2 represents an offset between a time slot where the DCI is located and a time slot where the PUSCH is located, in time slots. The types of PUSCH time domain resource allocation include Type A and Type B. The difference between Type A and Type B is that the value ranges of candidate values for S and L corresponding to the two types are different. Type A is mainly for slot-based services, S is relatively front-positioned, and L is relatively long. Type B is mainly for URLLC services, which have higher delay requirements, so the position of S is more flexible to transmit URLLC services that could arrive at any time, and L is shorter for reducing the transmission delay. The range of selectable values of S and L are shown in Table 4.

TABLE 4

| PUSCH type mapping | Normal cyclic prefix | | | Extended cyclic prefix | | |
|---|---|---|---|---|---|---|
| | S | L | S + L | S | L | S + L |
| Type A | 0 | {4, ..., 14} | {4, ..., 14} (repetitionType A only) | 0 | {4, ..., 12} | {4, ..., 12} |
| Type B | {0, ..., 13} | {1, ..., 14} | {1, ..., 14} for repetition Type A, {1, ..., 27} for repetition Type B | {0, ..., 11} | {1, ..., 12} | {1, ..., 12} |

Table 5 is a default table A corresponding to the TDRA indication field. When the terminal device receives DCI and obtains TDRA information, it determines the start position S, length L, K2, and a different type of PUSCH corresponding to the TDRA according to the default table A.

TABLE 5

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

There are two allocation types of frequency domain resources for PUSCH: Type0 and Type1.

The allocation type of frequency domain resources for PUSCH can be configured via higher layer signaling, or can be dynamically indicated in DCI. The Type0 frequency-domain resource allocation indicates a RBG allocated to the terminal device with a bitmap. The number of RBs contained in the RBG is configured by higher level parameters, e.g., Configuration 1, Configuration 2, and BWP size. For example, the number of RBs included in the RBG can be determined based on Table 6.

TABLE 6

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

The Type 1 frequency-domain resource allocation jointly encodes the starting position S and the length L of the resource to form an RIV. A group of (S, L) corresponds to an RIV value in a one-to-one manner, and the terminal device can derive the corresponding (S, L) based on the RIV value.

Here, the DMRS carried by the PUSCH (i.e., PUSCH DMRS) also includes a front loaded DMRS and an additional DMRS. The configuration of the time-domain and frequency-domain positions of the PUSCH DMRS is similar to the configuration of the time-domain and frequency-domain positions of the DMRS carried on the PDSCH (PDSCH DMRS), and details thereof will be omitted here. The higher layer parameters related to the configuration of the PUSCH DMRS also include dmrs-TypeA-Position, dmrs-AdditionalPosition, and maxLength.

The method for determining the time-frequency domain position of the DMRS on a single transmission of a data channel, such as PDSCH and PUSCH, has been described above in detail. However, as mentioned above, there is a need to adopt certain technologies so that the NR system can support operation of terminals with reduced capabilities. Based on this, it is considered to introduce the repetitive transmission of the data channel in the NR system to provide coverage enhancement of the data channel. Based on this, how to determine the time-domain and/or frequency-domain position of the DMRS in the repetitive transmission of the data channel is a technical problem to be solved in the present disclosure.

In order to solve the above technical problems, the present disclosure provides a wireless communication method, a terminal device and a network device. The inventive concept of the present disclosure consists in that, since the DMRS is used to demodulate a data channel, such as PDSCH and PUSCH, to evaluate the data channel, in order to improve the accuracy of channel evaluation, the time-frequency resource positions where the DMRS is located have different relative time-frequency resource positions in the time-frequency resource of the data channel between different repetitive transmissions of the data channel, such that the DMRS can have as many relative positions as possible in the time-frequency resource of the data channel.

The technical solutions of the present disclosure will be described in detail below with reference to specific embodiments.

It should be noted that, for repetitive transmissions of an uplink data channel and repetitive transmissions of a downlink data channel, as described above, the data channel carries a reference signal used to demodulate the data channel. For example, in the NR system, the reference signal includes a front loaded DMRS and/or an additional DMRS. Here, both the terminal device and the network device need to obtain the time-frequency domain positions where the reference signal is located on the repetitive transmissions of the data channel, and transmit the reference channel at the corresponding time-frequency domain positions. The technical solution of the present disclosure can be divided into the following parts below:

1. the case in which the terminal device and the network device obtain the time-domain relative positions where the reference signal is located in the repetitive transmissions of the data channel; 2. the case in which the terminal device and the network device obtain the frequency-domain relative positions where the reference signal is located in the repetitive transmissions of the data channel; and 3. the case in which the terminal device and the network device obtain the time-domain relative positions and the frequency-domain relative positions where the reference signal is located in the repetitive transmissions of the data channel.

Embodiment 1

Figure 6:
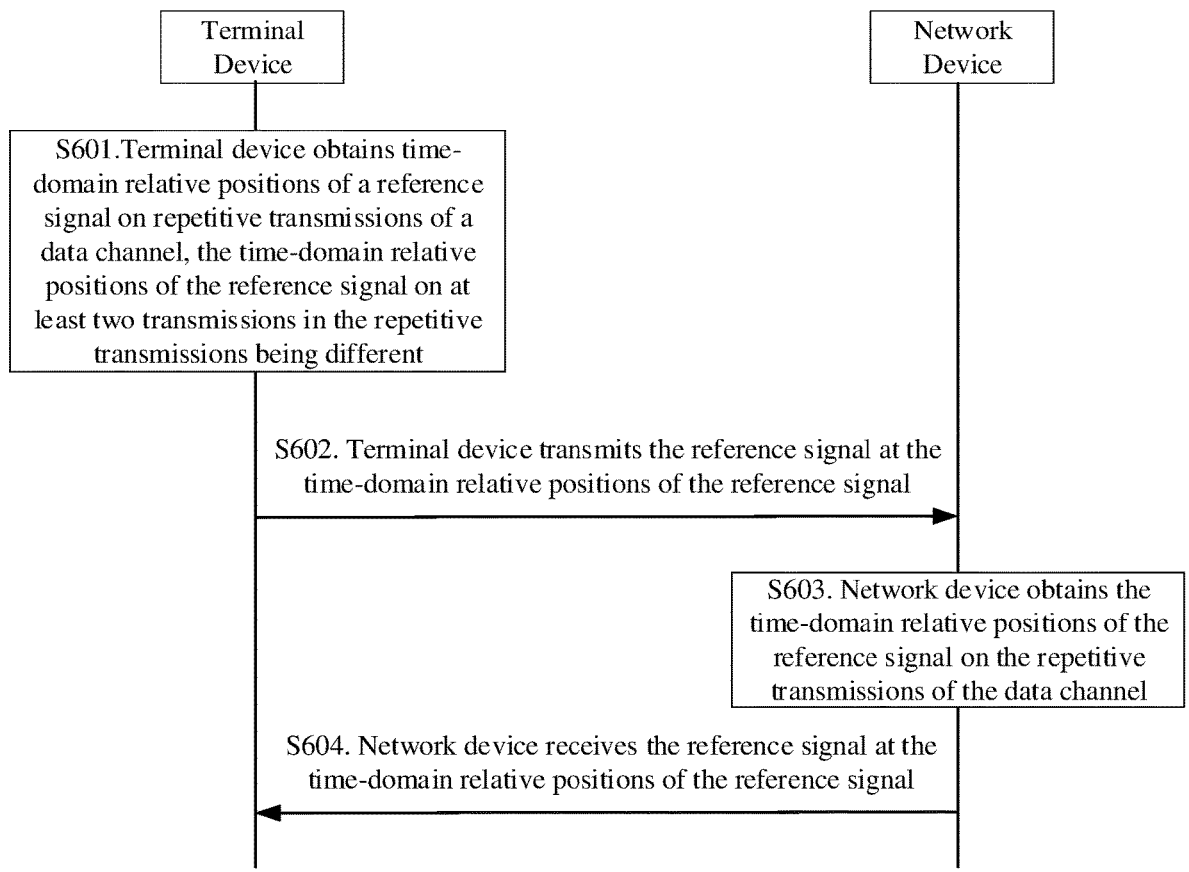
FIG. 6 is an interaction flowchart of a wireless communication method according to an embodiment of the present disclosure.

For repetitive transmissions of an uplink data channel, FIG. 6 is an interaction flowchart of a wireless communication method according to an embodiment of the present disclosure, and the method includes the following steps.

At step S601, a terminal device obtains time-domain relative positions of a reference signal on repetitive transmissions of a data channel. The time-domain relative positions of the reference signal on at least two transmissions in the repetitive transmissions are different.

Optionally, at step S602, the terminal device transmits the reference signal at the time-domain relative positions of the reference signal.

At step S603, a network device obtains the time-domain relative positions of the reference signal on the repetitive transmissions of the data channel.

Optionally, at step S604, the network device receives the reference signal at the time-domain relative positions of the reference signal.

It should be noted that the present disclosure is not limited to the order of the above step S603 and the steps S601 and S602. For example, the step S603 may be performed before the step S601, or may be performed between the step S602 and the step S603.

Optionally, the data channel in the steps S601 to S604 may be PUSCH.

Figure 7:
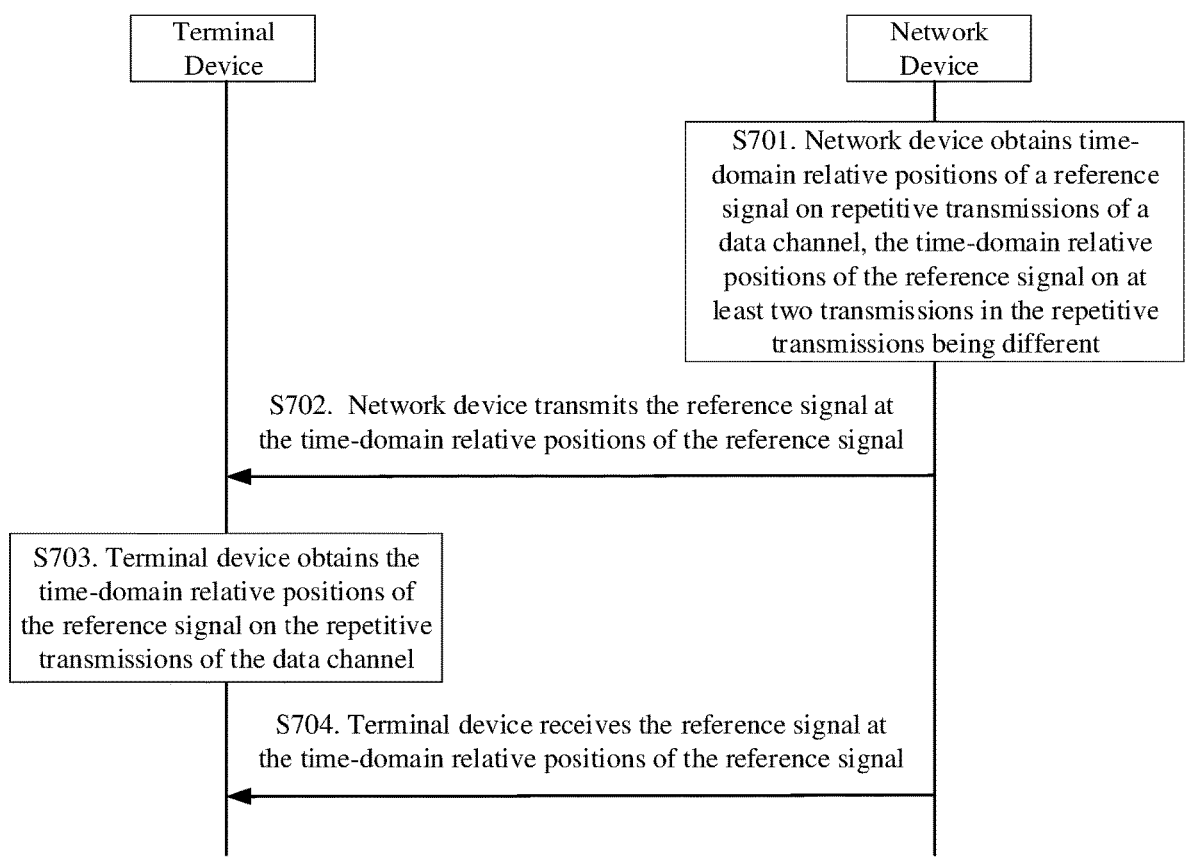
FIG. 7 is an interaction flowchart of a wireless communication method according to another embodiment of the present disclosure.

For repetitive transmissions of a downlink data channel, FIG. 7 is an interaction flowchart of a wireless communication method according to another embodiment of the present disclosure, and the method includes the following steps.

At step S701, a network device obtains time-domain relative positions of a reference signal on repetitive transmissions of a data channel. The time-domain relative positions of the reference signal on at least two transmissions in the repetitive transmissions are different.

Optionally, at step S702, the network device transmits the reference signal at the time-domain relative positions of the reference signal.

At step S703, a terminal device obtains the time-domain relative positions of the reference signal on the repetitive transmissions of the data channel.

Optionally, at step S704, the terminal device receives the reference signal at the time-domain relative positions of the reference signal.

It should be noted that the present disclosure is not limited to the order of the above step S703 and the steps S701 and S702. For example, the step S703 may be performed before the step S701, or may be performed between the step S702 and the step S703.

Optionally, the data channel in the steps S701 to S704 may be PDSCH.

The following explains the case where the time-domain relative positions of the reference signal on at least two transmissions in the repetitive transmissions are different, which is applicable to the scenario of repetitive transmissions of the uplink data channel and also to the scenario of repetitive transmissions of the downlink data channel.

It should be noted that, for any transmission on the repetitive transmissions, the time-domain relative position of the reference signal on the transmission is relative to the time-domain position of the data channel on the transmission. For example, the time-domain position of the data channel on the transmission (which can be the start time domain position) is Symbol 2, and the time-domain relative position of the reference signal on the transmission is 1 and its actual time-domain position is at Symbol 2. That is, the time domain position of the reference signal on the transmission is on the start symbol occupied by the data channel, i.e., Symbol 2.

Optionally, the network device may configure a front loaded DMRS for the repetitive transmissions, or the network device may configure a front loaded DMRS and an additional DMRS for the repetitive transmissions, and each of the repetitive transmissions may carry an additional DMRS. Alternatively, the network device may configure a front loaded DMRS and an additional DMRS for the repetitive transmissions, and some of the repetitive transmissions carry the additional DMRS while others do not. Based on this, the time-domain relative positions of the reference signal on at least two transmissions in the repetitive transmissions of the reference signal being different may include the following cases.

Case 1: The time-domain relative positions of the front loaded DMRS on the at least two transmissions are different.

Here, Case 1 is applicable to the scenario where the network device configures the front loaded DMRS for the repetitive transmissions.

Optionally, the above repetitive transmissions are in one time unit or in different time units, and one time unit may be one or more time slots, and the present disclosure is not limited to any of these examples.

Exemplarily, the following are two possible cases of PDSCH repetitive transmissions, such as repetitive transmissions within a time slot or repetitive transmissions across time slots.

Figure 8:
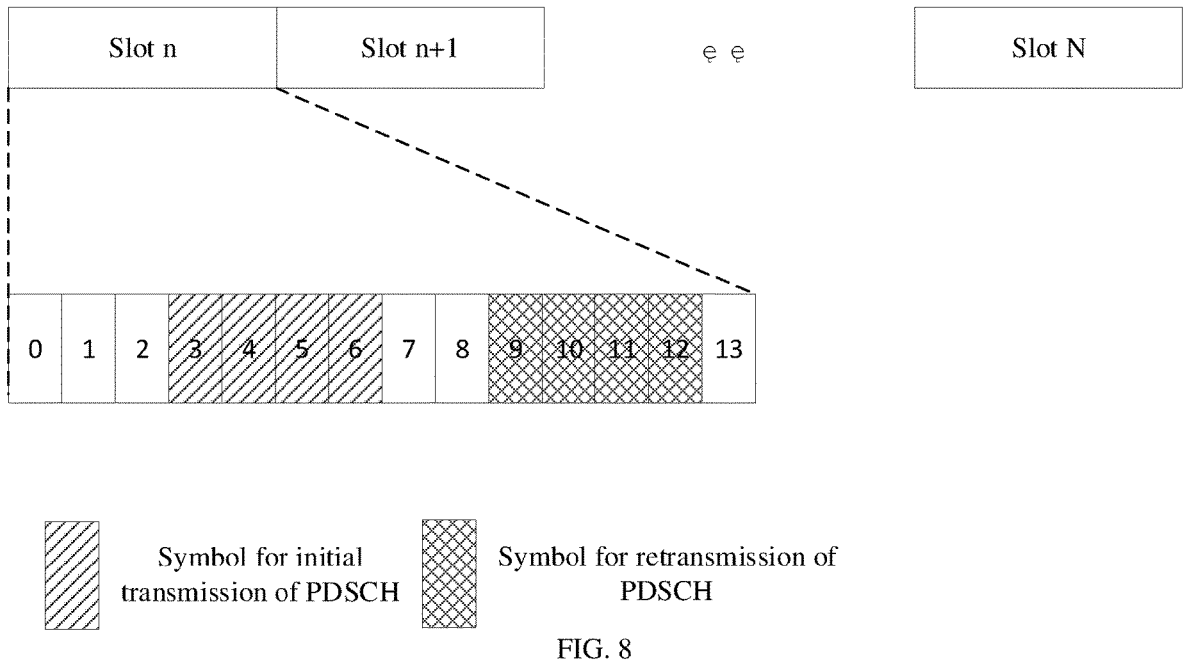
FIG. 8 is a schematic diagram showing repetitive PDSCH transmissions in a time slot according to an embodiment of the present disclosure.
Figure 9:
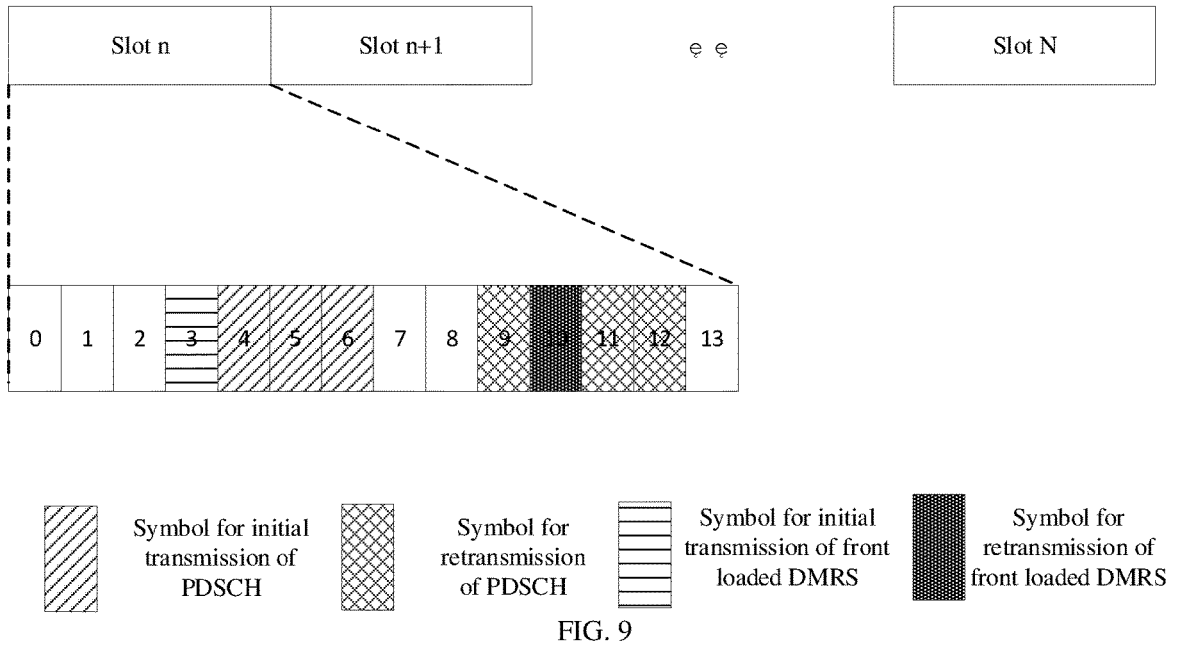
FIG. 9 is a schematic diagram showing a time-domain relative position of a front loaded DMRS according to an embodiment of the present disclosure.

FIG. 8 is a schematic diagram showing repetitive PDSCH transmissions in a time slot according to an embodiment of the present disclosure, and FIG. 9 is a schematic diagram showing the time-domain relative positions of the front loaded DMRS according to an embodiment of the present disclosure. With reference to FIG. 8 and FIG. 9, the PDSCH is transmitted for the first time in Symbols 3-6 of time slot n, and transmitted for the second time in Symbols 9-12 of time slot n. The actual time-domain position of the front loaded DMRS in the first transmission is Symbol 3, that is, its time-domain relative position is 1, i.e., the first symbol in the first transmission of the PDSCH. The actual time-domain position of the front loaded DMRS in the second transmission is Symbol 10, that is, its time-domain relative position is 2, i.e., the second symbol in the second transmission of the PDSCH.

Figure 10:
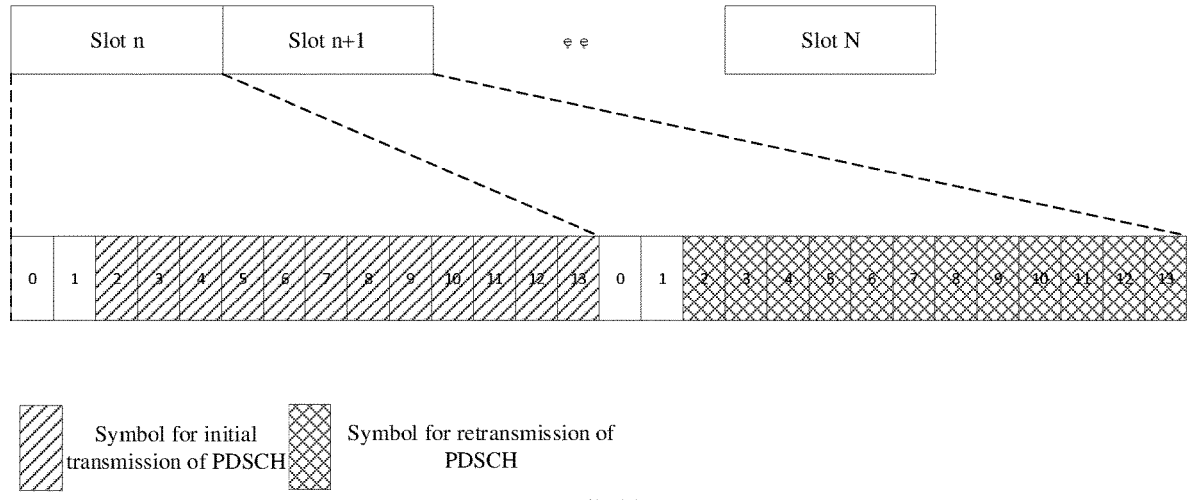
FIG. 10 is a schematic diagram showing repetitive PDSCH transmissions between time slots according to an embodiment of the present disclosure.
Figure 11:
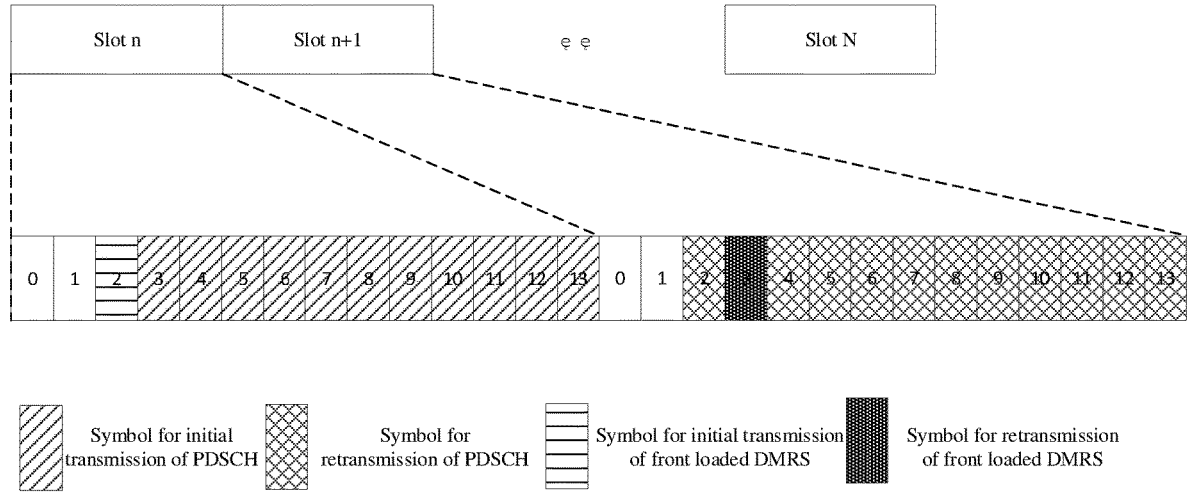
FIG. 11 is a schematic diagram showing a time-domain relative position of a front loaded DMRS according to another embodiment of the present disclosure.

FIG. 10 is a schematic diagram showing repetitive PDSCH transmissions across time slots according to an embodiment of the present disclosure, and FIG. 11 is a schematic diagram showing the time-domain relative position of the front loaded DMRS according to another embodiment of the present disclosure. With reference to FIG. 10 and FIG. 11, the PDSCH s transmitted for the first time in Symbols 2-13 of time slot n, and transmitted repeatedly for the second time in Symbols 2-13 of time slot n+1. The actual time-domain position of the front loaded DMRS in the first transmission is Symbol 2 in time slot n, that is, its time-domain relative position is 1, i.e., the first symbol in the first transmission of the PDSCH. The actual time domain position of the front loaded DMRS in the second transmission is Symbol 3 of time slot n+1, that is, its relative time domain position is 2, i.e., the second symbol in the second PDSCH transmission.

Optionally, the time-domain relative positions of the front loaded DMRS on the repetitive transmissions may be determined according to higher layer signaling and/or DCI. For example, for PDSCH mapping type A, the time domain positions of the front loaded DMRS on the repetitive transmissions are determined by the higher layer parameter dmrs-TypeA-Position, with dmrs-TypeA-Position= 1, 2, . . . , representing that the time-domain relative position of the front loaded DMRS is the first symbol in the first transmission of PDSCH, the second symbol in the second transmission, . . . , respectively. In another example, DCI transmitted by the network device to the terminal device can be used to uniquely determine the time-domain relative positions of the front loaded DMRS on the repetitive transmissions. Based on this, the terminal device determines the time-domain relative positions of the front loaded DMRS on the repetitive transmissions according to the DCI transmitted by the network device. In another example, the terminal device can determine a number of sets of time-domain relative positions of the front loaded DMRS on the repetitive transmissions according to higher layer signaling. Further, the terminal device can uniquely determine the time-domain relative positions of the front loaded DMRS on the repetitive transmissions from the number of sets of time-domain relative positions of the front loaded DMRS on the repetitive transmissions according to the DCI.

Optionally, the time-domain relative position of the front loaded DMRS on the first transmission in the repetitive transmissions may be determined according to higher layer signaling and/or DCI. The time-domain relative positions of the front loaded DMRS on non-first transmissions may be determined according to a predetermined rule. For example, for PDSCH mapping type A, the time domain position of the front loaded DMRS on the first transmission may be determined based on the higher layer parameter dmrs-TypeA-Position, with dmrs-TypeA-Position=1 indicating that the time-domain relative position of the front loaded DMRS is the first symbol in the first transmission of the PDSCH. The predetermined rule negotiated between the terminal device and the network device is: if the above repetitive transmissions include N transmissions, and the time-domain relative position of the front loaded DMRS signal in the i-th transmission includes Symbol n, then the time-domain relative position of the front loaded DMRS signal in the (i+1)-th transmission of the N transmissions includes Symbol n+k, where i is a positive integer, n is an integer, and k is a positive integer. When k=1 and the time-domain relative position of the front loaded DMRS is the first symbol in the first transmission of the PDSCH, it can be inferred that the time-domain relative position of the front loaded DMRS is the second symbol in the second transmission of the PDSCH, the time-domain relative position of the front loaded DMRS is the third symbol in the third transmission of the PDSCH. In another example, the DCI transmitted by the network device to the terminal device can be used to uniquely determine the time-domain relative position of the front loaded DMRS on the first transmission. Based on this and the predetermined rule, the terminal device can infer that the time-domain relative positions of the front loaded DMRS in the second, third, . . . , transmissions. In another example, the terminal device can determine a number of sets of time-domain relative positions of the front loaded DMRS on the first transmission according to higher layer signaling, and further, the terminal device can uniquely determine the time-domain relative position of the front loaded DMRS from the number of sets of time-domain relative positions of the front loaded DMRS on the first transmission according to DCI. The time-domain relative position of the front loaded DMRS on the first transmission is uniquely determined. Based on this and the predetermined rule, the terminal device can infer that the time-domain relative positions of the front loaded DMRS in the second, third, . . . , transmissions.

Case 2: The time-domain relative positions of the front loaded DMRS on the at least two transmissions are different, and the time-domain relative positions of the additional DMRS on the at least two transmissions are same.

Here, Case 2 is applicable to a scenario where the network device configures the front loaded DMRS and the additional DMRS for repetitive transmissions, and the additional DMRS is carried in each of the repetitive transmissions.

It should be noted that, for the example in which the time-domain relative positions of the front loaded DMRS on the at least two transmissions are different, reference may be made to the example in Case 1, and details thereof will be omitted here.

Optionally, the above repetitive transmissions may be in one time unit or in different time units, and one time unit may be one or more time slots, and the present disclosure is not limited to any of these examples.

Exemplarily, taking the repetitive transmissions of PDSCH in one time slot as an example, if the DCI received by the terminal device indicates the time domain length of PDSCH $l_d$=12, dmrs-AdditionalPosition is configured as pos2, and the terminal device is configured with PDSCH mapping type A, it can be determined from Table 7 that the symbols in which the additional DMRS is located on the at least two transmissions are both 6 and 9.

can determine the time-domain relative positions of the additional DMRS on the repetitive transmissions based on dmrs-AdditionalPosition and PDSCH mapping type A. In another example, the network device may establish a correspondence between DCI and time-domain relative positions of the additional DMRS, and based on this, the terminal device may determine the time-domain relative positions of the additional DMRS on the repetitive transmissions based on the DCI. In another example: as shown in Table 7, the time-domain relative positions of the additional DMRS on the repetitive transmissions are jointly determined according to DCI, dmrs-AdditionalPosition, and PDSCH mapping type A.

It should be noted that the time-domain relative positions of the front loaded DMRS and the additional DMRS on the repetitive transmissions can be jointly indicated by high-layer signaling. For example, the time-domain relative positions of the front loaded DMRS and the additional DMRS on the repetitive transmissions can be indicated by each of one or more higher layer signaling. Alternatively, the time-domain relative positions of the front loaded DMRS and the additional DMRS on the repetitive transmissions may be jointly indicated by DCI. For example, the time-domain relative positions of the front loaded DMRS and the additional DMRS on the repetitive transmissions may be indicated by each of one or more DCI. Alternatively, the time-domain relative positions of the front loaded DMRS and the additional DMRS on the repetitive transmissions may be jointly indicated by higher layer signaling and DCI. For example, the time-domain relative positions of the front loaded DMRS and the additional DMRS on the repetitive transmissions can be indicated by each of one or more higher layer signaling and one or more DCI. The present disclosure is not limited to any of these examples.

TABLE 7

| | DM-RS postions $\bar{l}$ | | | | | | | |
|---|---|---|---|---|---|---|---|---|
| | PDSCH mapping type A dmrs-AdditionalPosition | | | | PDSCH mapping type B dmrs-AdditionalPosition | | | |
| $l_d$ in symbols | pos0 | pos1 | pos2 | pos3 | pos0 | pos1 | pos2 | pos3 |
| 2 | — | — | — | — | $l_0$ | $l_0$ | $l_0$ | $l_0$ |
| 3 | $l_0$ | $l_0$ | $l_0$ | $l_0$ | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$- | $l_0$, 4- | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$- | $l_0$, 6- | $l_0$, 3, 6 | $l_0$, 3, 6 |
| 9 | $l_0$ | $l_0$, 7 | $l_0$, 7 | $l_0$, 7 | $l_0$- | $l_0$, 7- | $l_0$, 4, 7 | $l_0$, 4, 7 |
| 10 | $l_0$ | $l_0$, 9 | $l_0$, 6, 9 | $l_0$, 6, 9 | $l_0$- | $l_0$, 7- | $l_0$, 4, 7 | $l_0$, 4, 7 |
| 11 | $l_0$ | $l_0$, 9 | $l_0$, 6, 9 | $l_0$, 6, 9 | $l_0$- | $l_0$, 8- | $l_0$, 4, 8 | $l_0$, 3, 6, 9 |
| 12 | $l_0$ | $l_0$, 9 | $l_0$, 6, 9 | $l_0$, 5, 8, 11 | $l_0$- | $l_0$, 9- | $l_0$, 5, 9 | $l_0$, 3, 6, 9 |
| 13 | $l_0$ | $l_0$, 11 | $l_0$, 7, 11 | $l_0$, 5, 8, 11 | $l_0$- | $l_0$, 9- | $l_0$, 5, 9 | $l_0$, 3, 6, 9 |
| 14 | $l_0$ | $l_0$, 11 | $l_0$, 7, 11 | $l_0$, 5, 8, 11 | — | — | — | — |

Optionally, the time-domain relative positions of the additional DMRS on the repetitive transmissions are determined according to higher layer signaling and/or DCI. For example, the network device can establish a correspondence between combinations of dmrs-AdditionalPosition and PDSCH mapping type A and time-domain relative positions of the additional DMRS. Based on this, the terminal device Optionally, the time-domain relative positions of the additional DMRS on the first transmission in the repetitive transmissions may be determined according to higher layer signaling and/or DCI. The time-domain relative positions of the additional DMRS on non-first transmissions may be determined according to a predetermined rule. For example, the network device can establish a correspondence between combinations of dmrs-AdditionalPosition and PDSCH mapping type A and time-domain relative positions of the additional DMRS in the first transmission. Based on this, the terminal device can determine the time-domain relative position of the additional DMRS on the first transmission based on dmrs-AdditionalPosition and PDSCH mapping type A. Further, it is assumed that the above predetermined rule specifies that the time-domain relative positions of the additional DMRS in the non-first transmissions are the same as that in the first transmission. Based on this, the time-domain relative positions of the additional DMRS on the non-first transmissions can be determined. In another example, the network device may establish a correspondence between DCI and time-domain relative positions of the additional DMRS in the first transmission. Based on this, the terminal device may determine the time-domain relative position of the additional DMRS in the first transmission based on the DCI. Further, it is assumed that the above predetermined rule specifies that the time-domain relative positions of the additional DMRS in the non-first transmissions are the same as that in the first transmission. Based on this, the time-domain relative positions of the additional DMRS on the non-first transmissions can be determined. In another example, as shown in Table 7, the time-domain relative position of the additional DMRS on the first transmission can be jointly determined according to DCI, dmrs-AdditionalPosition and PDSCH mapping type A. Further, it is assumed that the above predetermined rule specifies that the time-domain relative positions of the additional DMRS in the non-first transmissions are the same as that in the first transmission. Based on this, the time-domain relative positions of the additional DMRS on the non-first transmissions can be determined.

It should be noted that the time-domain relative positions of the front loaded DMRS and the additional DMRS on the first transmission can be jointly indicated by higher layer signaling. For example, the time-domain relative position of the front loaded DMRS and the additional DMRS on the first transmission can be indicated by each of one or more higher layer signaling. Alternatively, the time-domain relative positions of the front loaded DMRS and the additional DMRS on the first transmission can be jointly indicated by DCI. For example, the time-domain relative positions of the front loaded DMRS and the additional DMRS on the first transmission can be indicated by each of one or more DCI. Alternatively, the time-domain relative positions of the front loaded DMRS and the additional DMRS on the first transmission may be jointly indicated by higher layer signaling and DCI. For example, the time-domain relative positions of the front loaded DMRS and the additional DMRS on the first transmission can be indicated by each of one or more higher layer signaling and one or more DCI. The present disclosure is not limited to any of these examples.

Case 3: The time-domain relative positions of the front loaded DMRSs on the at least two transmissions are same, and the time-domain relative positions of the additional DMRSs on the at least two transmissions are different.

Here, Case 3 is applicable to a scenario in which the network device configures the front loaded DMRS and the additional DMRS for repetitive transmissions, and the additional DMRS is carried in each of the repetitive transmissions.

Optionally, the above repetitive transmissions may be in one time unit or in different time units, and one time unit may be one or more time slots, and the present disclosure is not limited to any of these examples.

Exemplarily, the following are two possible cases of PDSCH repetitive transmissions, such as repetitive transmissions within a time slot or repetitive transmissions across time slots.

Figure 12:
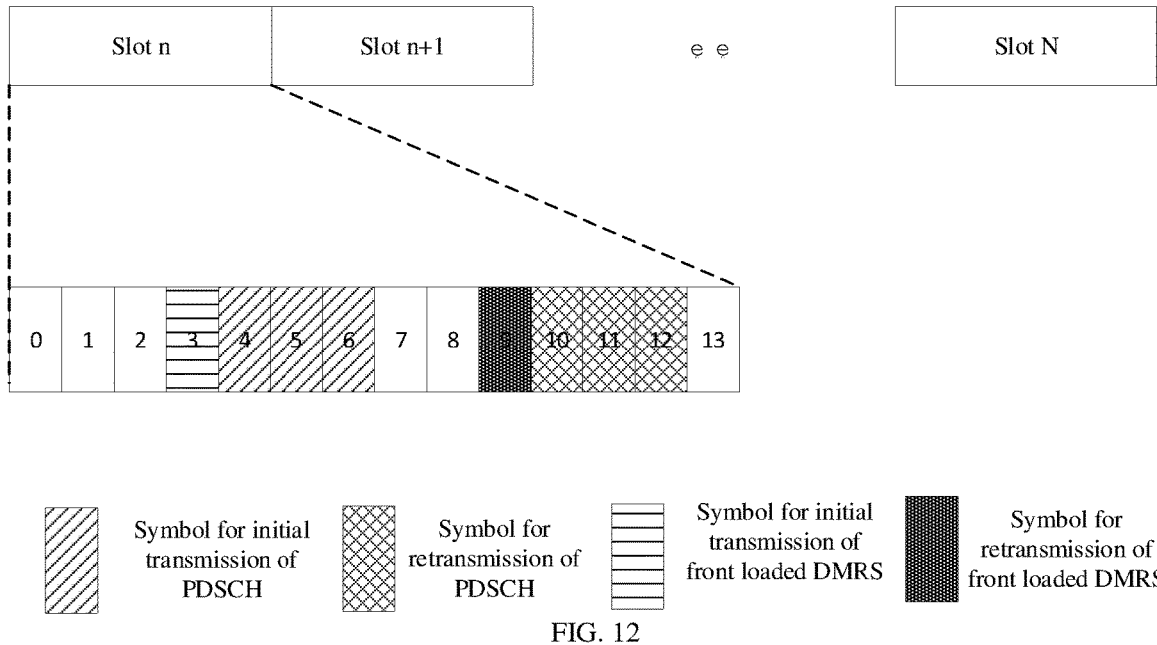
FIG. 12 is a schematic diagram showing a time-domain relative position of a front loaded DMRS according to an embodiment of the present disclosure.

FIG. 12 is a schematic diagram showing the time-domain relative position of the front loaded DMRS according to an embodiment of the present disclosure. With reference to FIG. 8 and FIG. 12, the PDSCH is transmitted for the first time in Symbols 3-6 of time slot n, and transmitted repeatedly for the second time in Symbol 9-12 of time slot n. The actual time domain position of the front loaded DMRS in the first transmission is Symbol 3, that is, its time-domain relative position is 1, i.e., the first symbol in the first transmission of the PDSCH. The actual time domain position of the front loaded DMRS in the second transmission is Symbol 9, that is, its relative time domain position is 1, i.e., the first symbol in the second transmission of the PDSCH.

Figure 13:
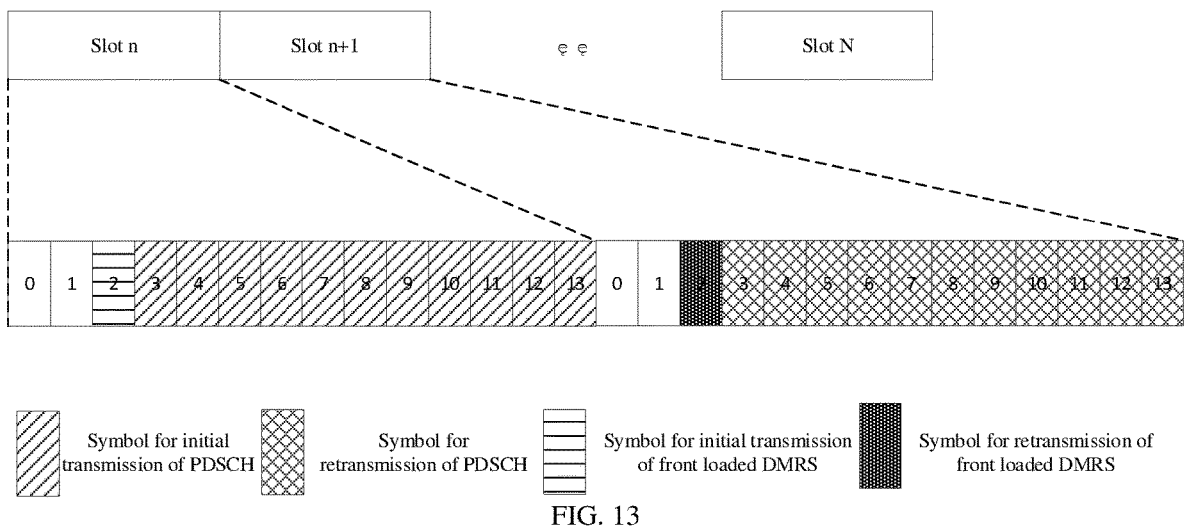
FIG. 13 is a schematic diagram showing a time-domain relative position of a front loaded DMRS according to another embodiment of the present disclosure.

FIG. 13 is a schematic diagram showing the time-domain relative position of the front loaded DMRS according to another embodiment of the present disclosure. With reference to FIG. 10 and FIG. 13, the PDSCH is transmitted for the first time in Symbols 2-13 of time slot n, and transmitted repeatedly for the second time in Symbols 2-13 of time slot n+1. The actual time domain position of the front loaded DMRS in the first transmission is Symbol 2 in time slot n, that is, its relative time domain position is 1, i.e., the first symbol in the first transmission of the PDSCH. The actual time domain position of the front loaded DMRS in the second transmission is Symbol 2 in time slot n+1, that is, its relative time domain position is 1, i.e., the first symbol in the second transmission of the PDSCH.

Optionally, the time-domain relative positions of the front loaded DMRS on the repetitive transmissions may be determined according to higher layer signaling and/or DCI. For example, for PDSCH mapping type A, the time domain positions of the front loaded DMRS on the repetitive transmissions may be determined by the higher layer parameter dmrs-TypeA-Position, with dmrs-TypeA-Position=1 indicating that the time-domain relative position of the front loaded DMRS is the first symbol in each transmission of the PDSCH. In another example, the DCI transmitted by the network device to the terminal device can be used to uniquely determine the time-domain relative positions of the front loaded DMRS on the repetitive transmissions. Based on this, the terminal device can determine the time-domain relative positions of the front loaded DMRS on the repetitive transmissions according to the DCI transmitted by the network device. In another example, the terminal device can determine a number of sets of time-domain relative positions of the front loaded DMRS on the repetitive transmissions according to the higher layer signaling, and further, the terminal device can uniquely determine the time-domain relative positions of the front loaded DMRS on the repetitive transmissions from the number of sets of time-domain relative positions of the front loaded DMRS on the repetitive transmissions according to the DCI.

Optionally, the time-domain relative position of the front loaded DMRS on the first transmission in the repetitive transmissions may be determined according to higher layer signaling and/or DCI. The time-domain relative positions of the front loaded DMRS on non-first transmissions may be determined according to a predetermined rule. For example, for PDSCH mapping type A, the time domain position of the front loaded DMRS on the first transmission may be determined based on the higher layer parameter dmrs-TypeA-Position, with dmrs-TypeA-Position=1 indicating that the time-domain relative position of the front loaded DMRS is the first symbol in the first transmission of the PDSCH. The predetermined rule negotiated between the terminal device and the network device is: the time-domain relative positions of the front loaded DMRS on the non-first transmissions are the same as the time-domain relative position of the front loaded DMRS on the first transmission. Based on this, the time-domain relative positions of the front loaded DMRS on the non-first transmissions can be derived. In another example, the DCI transmitted by the network device to the terminal device can be used to uniquely determine the time-domain relative position of the front loaded DMRS on the first transmission, and then the time-domain relative positions of the front loaded DMRS on the non-first transmissions can be inferred according to a predetermined rule. In another example, the terminal device can determine a number of sets of time-domain relative position of the front loaded DMRS on the first transmission according to higher layer signaling, and then infer the time-domain relative positions of the front loaded DMRS on the non-first transmissions according to the predetermined rule.

Figure 14:
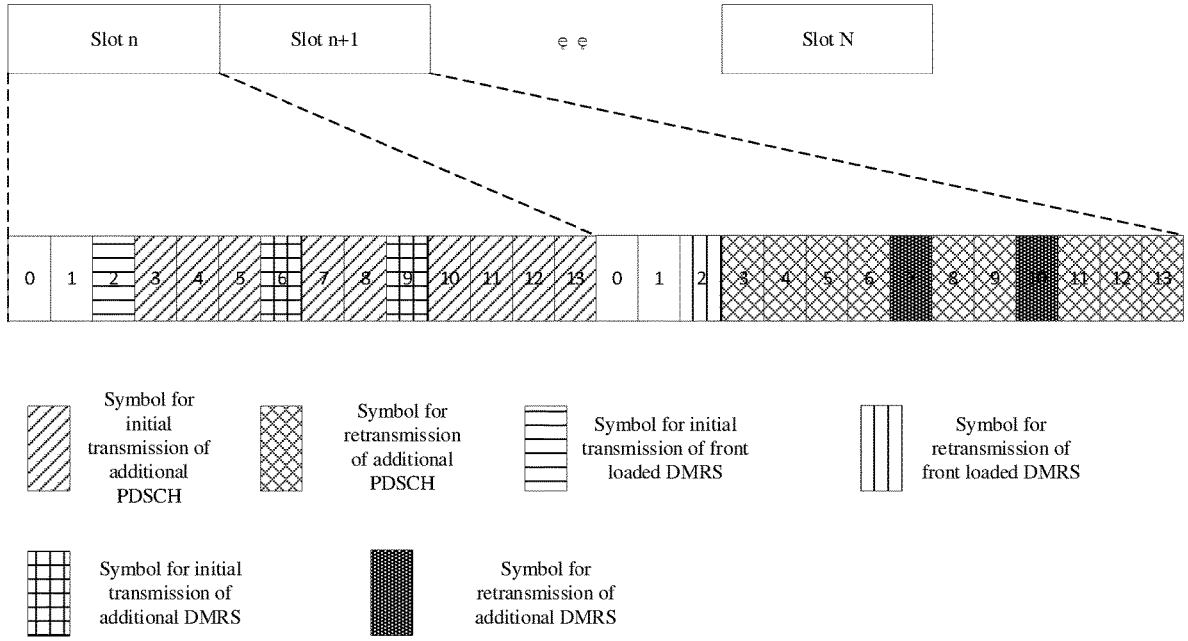
FIG. 14 is a schematic diagram showing a time-domain relative position of an additional DMRS according to an embodiment of the present disclosure.

As described in Case 3, the time-domain relative positions of the additional DMRS on the at least two transmissions are different. Exemplarily, FIG. 14 is a schematic diagram showing the time-domain relative positions of the additional DMRS according to an embodiment of the present disclosure. As shown in FIG. 14, taking the repetitive transmissions of the PDSCH in one time slot as an example, if the DCI received by the terminal device indicates the time domain length the PDSCH $l_d$=12, dmrs-AdditionalPosition is configured as pos2, and the terminal device is configured with PDSCH mapping type A. According to Table 7, it can be determined that the symbols in which the additional DMRS in one of the at least two transmissions is located are 6 and 9, and the symbols in which the additional DMRS of the other one of the at least two transmissions is located are 7 and 10. The symbol in which the front loaded DMRS is located is 2 in each of the at least two transmissions.

Optionally, the time-domain relative positions of the additional DMRS on the repetitive transmissions are determined according to higher layer signaling and/or DCI. For example, the network device can establish a correspondence between combinations of dmrs-AdditionalPosition and PDSCH mapping type A and time-domain relative positions of the additional DMRS. Based on this, the terminal device can determine the time-domain relative positions of the additional DMRS on the repetitive transmissions based on dmrs-AdditionalPosition and PDSCH mapping type A, and the time-domain relative positions of the additional DMRS on the repetitive transmissions are different. In another example, the network device may establish a correspondence between DCI and time-domain relative positions of the additional DMRS, and based on this, the terminal device may determine the time-domain relative positions of the additional DMRS on the repetitive transmissions based on the DCI, and the time-domain relative positions of the additional DMRS on the repetitive transmissions. In another example, as shown in Table 7, the time-domain relative positions of the additional DMRS on the repetitive transmissions are jointly determined according to DCI, dmrs-AdditionalPosition and PDSCH mapping type A.

It should be noted that the time-domain relative positions of the front loaded DMRS and the additional DMRS on the repetitive transmissions can be jointly indicated by high-layer signaling. For example, the time-domain relative positions of the front loaded DMRS and the additional DMRS on the repetitive transmissions can be indicated by each of one or more higher layer signaling. Alternatively, the time-domain relative positions of the front loaded DMRS and the additional DMRS on the repetitive transmissions may be jointly indicated by DCI. For example, the time-domain relative positions of the front loaded DMRS and the additional DMRS on the repetitive transmissions may be indicated by each of one or more DCI. Alternatively, the time-domain relative positions of the front loaded DMRS and the additional DMRS on the repetitive transmissions may be jointly indicated by higher layer signaling and DCI. For example, the time-domain relative positions of the front loaded DMRS and the additional DMRS on the repetitive transmissions can be indicated by each of one or more higher layer signaling and one or more DCI. The present disclosure is not limited to any of these examples.

Optionally, the time-domain relative positions of the additional DMRS on the first transmission in the repetitive transmissions may be determined according to higher layer signaling and/or DCI. The time-domain relative positions of the additional DMRS on non-first transmissions may be determined according to a predetermined rule. For example, the network device can establish a correspondence between combinations of dmrs-AdditionalPosition and PDSCH mapping type A and time-domain relative positions of the additional DMRS in the first transmission. Based on this, the terminal device can determine the time-domain relative position of the additional DMRS on the first transmission based on dmrs-AdditionalPosition and PDSCH mapping type A. Further, it is assumed that the above predetermined rule specifies that if the above repetitive transmissions include N transmissions, and the time-domain relative position of the front loaded DMRS signal in the i-th transmission includes Symbol n, then the time-domain relative position of the front loaded DMRS signal in the (i+1)-th transmission of the N transmissions includes Symbol n+k, where i is a positive integer, n is an integer, and k is a positive integer. Based on this, the time-domain relative positions of the additional DMRS on the non-first transmissions can be determined. In another example, the network device may establish a correspondence between DCI and time-domain relative positions of the additional DMRS in the first transmission. Based on this, the terminal device may determine the time-domain relative position of the additional DMRS in the first transmission based on the DCI. Further, it is assumed that the above predetermined rule specifies that if the above repetitive transmissions include N transmissions, and the time-domain relative position of the front loaded DMRS signal in the i-th transmission includes Symbol n, then the time-domain relative position of the front loaded DMRS signal in the (i+1)-th transmission of the N transmissions includes Symbol n+k, where i is a positive integer, n is an integer, and k is a positive integer. Based on this, the time-domain relative positions of the additional DMRS on the non-first transmissions can be determined. In another example, as shown in Table 7, the time-domain relative position of the additional DMRS on the first transmission can be jointly determined according to DCI, dmrs-Additional Position and PDSCH mapping type A. Further, it is assumed that the above-mentioned predetermined rule specifies that if the above repetitive transmissions include N transmissions, and the time-domain relative position of the front loaded DMRS signal in the i-th transmission includes Symbol n, then the time-domain relative position of the front loaded DMRS signal in the (i+1)-th transmission of the N transmissions includes Symbol n+k, where i is a positive integer, n is an integer, and k is a positive integer. Based on this, the time-domain relative positions of the additional DMRS on the non-first transmissions can be determined.

It should be noted that the time-domain relative positions of the front loaded DMRS and the additional DMRS on the first transmission can be jointly indicated by higher layer signaling. For example, the time-domain relative position of the front loaded DMRS and the additional DMRS on the first transmission can be indicated by each of one or more higher layer signaling. Alternatively, the time-domain relative positions of the front loaded DMRS and the additional DMRS on the first transmission can be jointly indicated by DCI. For example, the time-domain relative positions of the front loaded DMRS and the additional DMRS on the first transmission can be indicated by each of one or more DCI. Alternatively, the time-domain relative positions of the front loaded DMRS and the additional DMRS on the first transmission may be jointly indicated by higher layer signaling and DCI. For example, the time-domain relative positions of the front loaded DMRS and the additional DMRS on the first transmission can be indicated by each of one or more higher layer signaling and one or more DCI. The present disclosure is not limited to any of these examples.

Case 4: The time-domain relative positions of the front loaded DMRSs on the at least two transmissions are different, and the time-domain relative positions of the additional DMRSs on the at least two transmissions are different.

Here, Case 4 is applicable to a scenario in which the network device configures the front loaded DMRS and the additional DMRS for the repetitive transmissions, and the additional DMRS is carried in each of the repetitive transmissions.

It should be noted that, for the example in which the time-domain relative positions of the front loaded DMRS on the at least two transmissions are different, reference may be made to the example in Case 1, and details thereof will be omitted here. For the example in which the time-domain relative positions of the additional DMRS on the at least two transmissions are different, reference may be made to the example in Case 3, and details thereof will be omitted here.

Case 5: The time-domain relative positions of the front loaded DMRS on the at least two transmissions are same, there is an additional DMRS in at least one of the at least two transmissions, and there is no additional DMRS in at least one of the at least two transmissions.

Case 5 is applicable to the following scenario: the network device configures the front loaded DMRS and the additional DMRS for the repetitive transmissions, and some of the repetitive transmissions carry the additional DMRS while others do not.

It should be noted that there is an additional DMRS in at least one of the at least two transmissions, such that the at least one transmission involves the time-domain relative position of the additional DMRS. There is no additional DMRS in at least one of the at least two transmissions, such that the at least one transmission does not involve the time-domain relative position of the additional DMRSs. In summary, this case can be understood as: the time-domain relative positions of the additional DMRS in the at least two transmissions are different.

For the example in which the time-domain relative positions of the front loaded DMRS on the at least two transmissions are same, reference may be made to the example in Case 3, and details thereof will be omitted here.

Exemplarily, taking the repetitive transmissions of PDSCH in one time slot as an example, if the DCI received by the terminal device indicates the time domain length of PDSCH $l_d=12$, dmrs-AdditionalPosition is configured as pos2, and the terminal device is configured with PDSCH mapping type A, it can be determined from Table 7 that the symbols in which the additional DMRS is located in at least one of the at least two transmissions are 6 and 9. There is no transmission of the additional DMRS in at least one of the at least two transmissions, that is, there is no symbol where the additional DMRS is located.

Optionally, the time-domain relative position of the additional DMRS on the repetitive transmissions may be determined according to higher layer signaling and/or DCI. For details, reference can be made to Case 2 and Case 3, and description thereof will be omitted.

Optionally, the time-domain relative position of the additional DMRS on the first transmission in the repetitive transmissions may be determined according to higher layer signaling and/or DCI, and the time-domain relative positions of the additional DMRS on non-first transmissions may be determined according to a predetermined rule. For details, reference can be made to Case 2 and Case 3, and description thereof will be omitted.

Case 6: The time-domain relative positions of the front loaded DMRS in the at least two transmissions are different, there is an additional DMRS in at least one of the at least two transmissions, and there is no additional DMRS in at least one of the at least two transmissions.

Case 6 is applicable to the following scenario: the network device configures the front loaded DMRS and the additional DMRS for the repetitive transmissions, and some of the repetitive transmissions carry the additional DMRS while others do not.

It should be noted that there is an additional DMRS in at least one of the at least two transmissions, such that the at least one transmission involves the time-domain relative position of the additional DMRS. There is no additional DMRS in at least one of the at least two transmissions, such that the at least one transmission does not involve the time-domain relative position of the additional DMRSs. In summary, this case can be understood as: the time-domain relative positions of the additional DMRS in the at least two transmissions are different.

For the example in which the time-domain relative positions of the front loaded DMRS in the at least two transmissions are different, reference may be made to the example in Case 1, and details thereof will be omitted here.

For the example in which there is an additional DMRS in at least one of the at least two transmissions and there is no additional DMRS in at least one of the at least two transmissions, reference may be made to the example in Case 5, and details thereof will be omitted here.

Optionally, the time-domain relative positions of the additional DMRS on the repetitive transmissions may be determined according to higher layer signaling and/or DCI. For details, reference can be made to Case 2 and Case 3, and description thereof will be omitted.

Optionally, the time-domain relative position of the additional DMRS on the first transmission in the repetitive transmissions may be determined according to higher layer signaling and/or DCI, and the time-domain relative positions of the additional DMRS on non-first transmissions may be determined according to a predetermined rule. For details, reference can be made to Case 2 and Case 3, and description thereof will be omitted.

In addition, the present disclosure may further include Case 7, where there is a front loaded DMRS and/or an additional DMRS in at least one of the at least two transmissions, and there is no front loaded DMRS and/or no additional DMRS in at least one of the at least two transmissions.

Exemplarily, there is a front loaded DMRS in at least one of the at least two transmissions, and there is no front loaded DMRS in at least one of the at least two transmissions.

It should be noted that there is a front loaded DMRS in at least one of the at least two transmissions, such that the at least one transmission involves the time-domain relative position of the front loaded DMRS. There is no front loaded DMRS in at least one of the at least two transmissions, such that the at least one transmission does not involve the time-domain relative position of the front loaded DMRS. In summary, this case can be understood as: the time-domain relative positions of the front loaded DMRS in the at least two transmissions are different. For the example in which the time-domain relative positions of the front loaded DMRS in the at least two transmissions are different, reference may be made to the example in Case 1, and details thereof will be omitted here.

Exemplarily, there is a front loaded DMRS and an additional DMRS in at least one of the at least two transmissions, and there is no front loaded DMRS and no additional DMRS in at least one of the at least two transmissions.

It should be noted that there are front loaded and additional DMRSs in at least one of the at least two transmissions, such that the at least one transmission involves the time-domain relative positions of the front loaded and additional DMRSs. There are no front loaded and additional DMRSs in at least one of the at least two transmissions, such that the at least one transmission does not involve the time-domain relative positions of the front loaded and additional DMRSs. In summary, this case can be understood as: the time-domain relative positions of the front loaded DMRS on the at least two transmissions are different, and the time-domain relative positions of the additional DMRS on the at least two transmissions are different. Therefore, reference can be made to the example in Case 4, and details thereof will be omitted here.

It is worth mentioning that Case 7 is applicable to the following scenario: when the number of symbols allocated in the time domain resource of the data channel is relatively small, e.g., two symbols, for two consecutive retransmissions, since they are close to each other in the time domain, the latter transmission may contain no DMRS and the DMRS of the earlier transmission is used for channel estimation. This can reduce the overhead of DMRS.

It should be noted that, in the present disclosure, both the terminal device and the network device can obtain the time-domain relative positions of the reference signal, and the time-domain relative positions of the reference signal obtained by the terminal device and the network device present the same result. Therefore, for the time-domain relative positions of the reference signal obtained by the network device, reference can be made to those obtained by the terminal device. The difference is that for the terminal device, the network device can configure the terminal device with the time-domain relative positions of the reference signal via higher layer signaling and/or DCI. For the network device, the time-domain relative positions of the reference signal can be determined internally according to higher layer signaling or other pre-configuration schemes.

To summarize, in the scenario of repetitive transmissions of the data channel, the present disclosure provides a method for determining the time-domain relative positions of the DMRS in the repetitive transmissions of the data channel. Further, between different repetitive transmissions of the data channel, the relative time-domain resource positions of the time-domain resource positions where the DMRS is located are different in the time-domain resource of the data channel, which can provide as many relative positions of the DMRS as possible in the time domain resource of the data channel. It is beneficial to perform channel estimation on more relative time-domain resources and improve the demodulation performance of the data channel.

Embodiment 2

Figure 15:
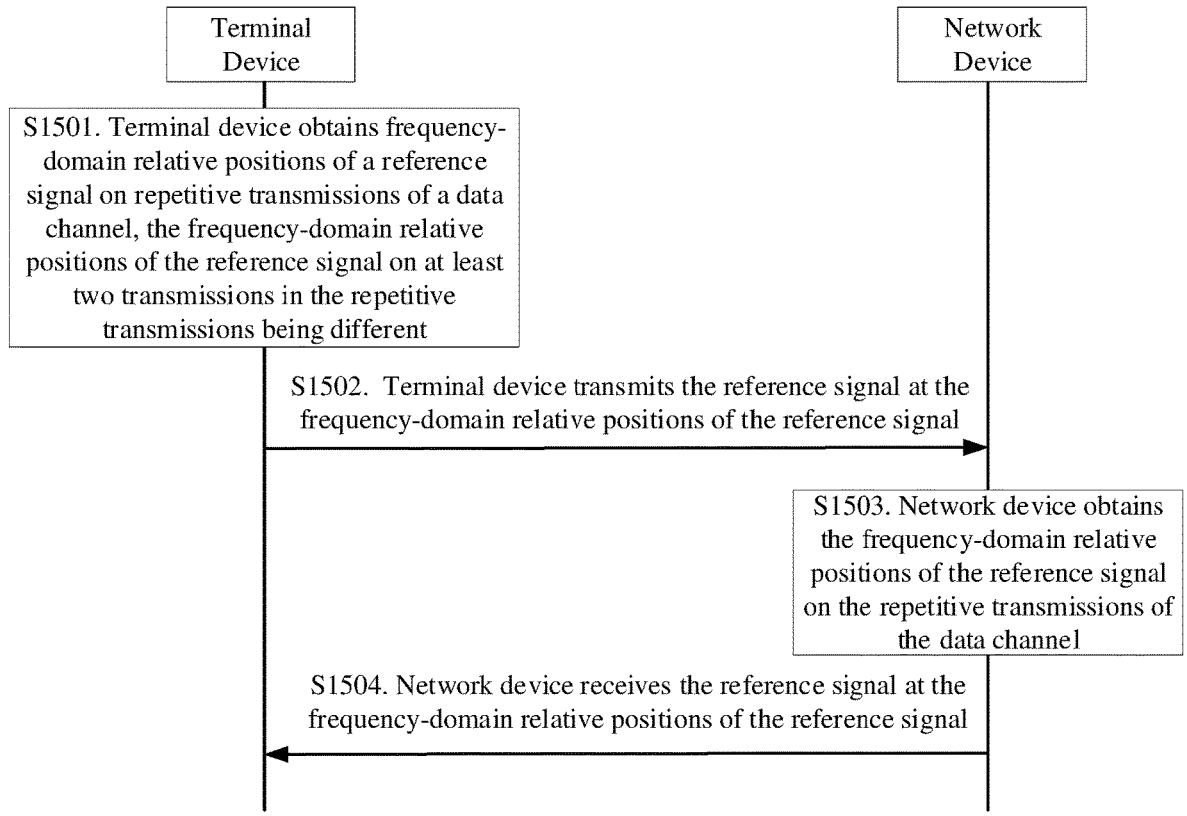
FIG. 15 is an interaction flowchart of a wireless communication method according to another embodiment of the present disclosure.

For repetitive transmissions of an uplink data channel, FIG. 15 is an interaction flowchart of a wireless communication method according to still another embodiment of the present disclosure, and the method includes the following steps.

At step S1501, a terminal device obtains frequency-domain relative positions of a reference signal on repetitive transmissions of a data channel. The frequency-domain relative positions of the reference signal on at least two transmissions in the repetitive transmissions are different.

Optionally, at step S1502, the terminal device transmits the reference signal at the frequency-domain relative positions of the reference signal.

At step S1503, a network device obtains the frequency-domain relative positions of the reference signal on the repetitive transmissions of the data channel.

Optionally, at step S1504, the network device receives the reference signal at the frequency-domain relative positions of the reference signal.

It should be noted that the present disclosure is not limited to the order of the above step S1503 and the steps S1501 and S1502. For example, the step S1503 may be performed before the step S1501, or may be performed between the step S1502 and the step S1503.

Optionally, the data channel in the steps S1501 to S1504 may be PUSCH.

Figure 16:
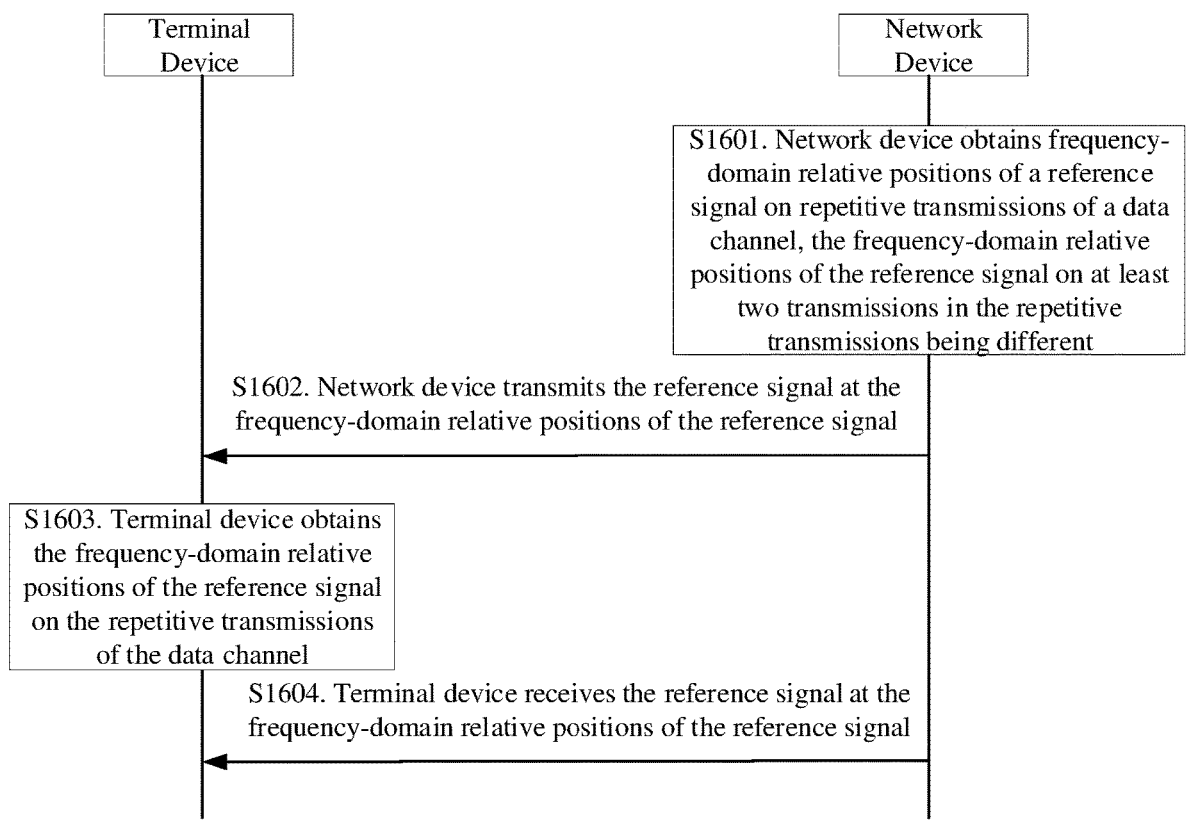
FIG. 16 is an interaction flowchart of a wireless communication method according to yet another embodiment of the present disclosure.

For repetitive transmissions of a downlink data channel, FIG. 16 is an interaction flowchart of a wireless communication method according to another embodiment of the present disclosure, and the method includes the following steps.

At step S1601, a network device obtains frequency-domain relative positions of a reference signal on repetitive transmissions of a data channel. The frequency-domain relative positions of the reference signal on at least two transmissions in the repetitive transmissions are different.

Optionally, at step S1602, the network device transmits the reference signal at the frequency-domain relative positions of the reference signal.

At step S1603, a terminal device obtains the frequency-domain relative positions of the reference signal on the repetitive transmissions of the data channel.

Optionally, at step S1604, the terminal device receives the reference signal at the frequency-domain relative positions of the reference signal.

It should be noted that the present disclosure is not limited to the order of the above step S1603 and the steps S1601 and S1602. For example, the step S1603 may be performed before the step S1601, or may be performed between the step S1602 and the step S1603.

Optionally, the data channel in the steps S1601 to S1604 may be PDSCH.

The following explains the case where the frequency-domain relative positions of the reference signal on at least two transmissions in the repetitive transmissions are different, which is applicable to the scenario of repetitive transmissions of the uplink data channel and also to the scenario of repetitive transmissions of the downlink data channel.

It should be noted that, for any transmission on the repetitive transmissions, the frequency-domain relative position of the reference signal on the transmission is relative to the frequency-domain position of the data channel on the transmission. For example, the frequency-domain position of the data channel on the transmission (which can be the start frequency domain position) is RE 0, and the frequency-domain relative position of the reference signal on the transmission is 1 and its actual frequency-domain position is at RE 0. That is, the frequency domain position of the reference signal on the transmission is on the start frequency occupied by the data channel, i.e., RE 0.

Optionally, the network device may configure a front loaded DMRS for the repetitive transmissions, or the network device may configure a front loaded DMRS and an additional DMRS for the repetitive transmissions, and each of the repetitive transmissions may carry an additional DMRS. Alternatively, the network device may configure a front loaded DMRS and an additional DMRS for the repetitive transmissions, and some of the repetitive transmissions carry the additional DMRS while others do not. Based on this, the frequency-domain relative positions of the reference signal on at least two transmissions in the repetitive transmissions of the reference signal being different may include the following cases.

Case 1: The frequency-domain relative positions of the front loaded DMRS on the at least two transmissions are different.

Here, Case 1 is applicable to the scenario where the network device configures the front loaded DMRS for the repetitive transmissions.

The frequency-domain position k of the front loaded DMRS can be determined according to:

$$k = \begin{cases} 4n + 2k' + \Delta & \text{Configuration type 1} \\ 6n + k' + \Delta & \text{Configuration type 2} \end{cases}$$

$$k' = 0, 1$$

$$n = 0, 1, \ldots$$

The parameter $\Delta$ determines the offset of the RE where the front loaded DMRS is located relative to a reference RE. The DMRSs of different antenna ports can be on different REs, or on the same RE but different code domains to keep orthogonal to each other. Table 8 shows the values of $\Delta$ and k' when the higher layer parameter is configuration type 1, and Table 9 shows the values of $\Delta$ and k' when the higher layer parameter is configuration type 2.

TABLE 8

| Virtual antenna index p | Code Domain group (CDM group) $\lambda$ | $\Delta$ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 9

| Virtual antenna index p | Code Domain group (CDM group) $\lambda$ | $\Delta$ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Figure 17:
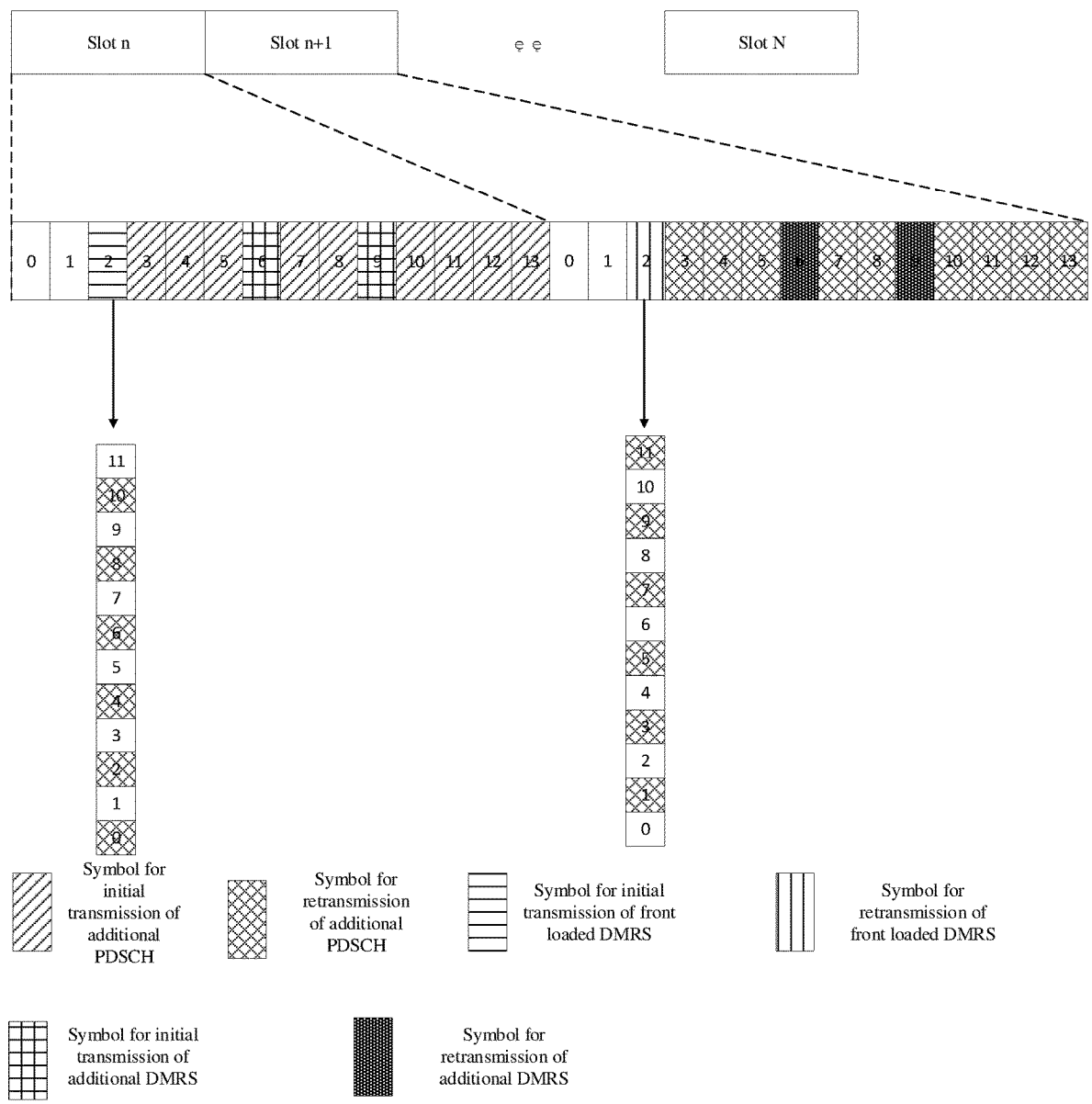
FIG. 17 is a schematic diagram showing a frequency-domain relative position of a front loaded DMRS according to an embodiment of the present disclosure.

It can be seen from the above equation and Table 8 and Table 9 that the frequency-domain position of the front loaded DMRS can be adjusted by adjusting the parameter $\Delta$. The frequency-domain position here can be understood as the actual frequency-domain position or absolute frequency-domain position. Based on this, the network device may configure different frequency-domain relative positions for the front loaded DMRS in at least two transmissions in the repetitive transmissions. For example, FIG. 17 is a schematic diagram showing the frequency-domain relative positions of the front loaded DMRS according to an embodiment of the present disclosure. As shown in FIG. 17, DMRS configuration type 1 is adopted. For the front loaded DMRS, in the first transmission, the RE positions of the front loaded DMRS in one RB are {0, 2, 4, 6, 8, 10}, and in the second transmission, the RE positions of the front loaded DMRS in one RB are {1, 3, 5, 7, 9, 11}.

Optionally, the frequency-domain relative positions of the front loaded DMRS on the repetitive transmissions may be determined according to higher layer signaling and/or DCI. For example: for DMRS configuration type 1, for the frequency-domain positions of the front loaded DMRS on the repetitive transmissions, the frequency-domain relative position in the first transmission is the RE positions of {0, 2, 4, 6, 8, 10} in one RB. In the second transmission, the RE positions of the front loaded DMRS in one RB are {1, 3, 5, 7, 9, 11}. In another example, DCI transmitted by the network device to the terminal device can be used to uniquely determine the frequency-domain relative positions of the front loaded DMRS on the repetitive transmissions. Based on this, the terminal device determines the frequency-domain relative positions of the front loaded DMRS on the repetitive transmissions according to the DCI transmitted by the network device. In another example, the terminal device can determine a number of sets of frequency-domain relative positions of the front loaded DMRS on the repetitive transmissions according to higher layer signaling. Further, the terminal device can uniquely determine the frequency-domain relative positions of the front loaded DMRS on the repetitive transmissions from the number of sets of frequency-domain relative positions of the front loaded DMRS on the repetitive transmissions according to the DCI.

Optionally, the frequency-domain relative position of the front loaded DMRS on the first transmission in the repetitive transmissions may be determined according to higher layer signaling and/or DCI. The frequency-domain relative positions of the front loaded DMRS on non-first transmissions are determined according to a predetermined rule. For example, for DMRS configuration type 1, for the frequency-domain positions of the front loaded DMRS on the repetitive transmissions, the frequency-domain relative position in the first transmission is the RE positions of $\{0, 2, 4, 6, 8, 10\}$ in one RB. The predetermined rule negotiated between the terminal device and the network device is: if the above repetitive transmissions include N transmissions, and the frequency-domain relative position of the front loaded DMRS signal in the i-th transmission includes RE n, then the frequency-domain relative position of the front loaded DMRS signal in the (i+1)-th transmission of the N transmissions includes RE n+k, where i is a positive integer, n is an integer, and k is a positive integer. Based on this, it can be inferred that the frequency-domain relative position of the front loaded DMRS is the RE positions of $\{1, 3, 5, 7, 9, 11\}$ in one RB in the second transmission of the PDSCH. In another example, the DCI transmitted by the network device to the terminal device can be used to uniquely determine the frequency-domain relative position of the front loaded DMRS on the first transmission. Based on this and the predetermined rule, the terminal device can infer that the frequency-domain relative positions of the front loaded DMRS in the second, third, . . . , transmissions. In another example, the terminal device can determine a number of sets of frequency-domain relative positions of the front loaded DMRS on the first transmission according to higher layer signaling, and further, the terminal device can uniquely determine the frequency-domain relative position of the front loaded DMRS from the number of sets of frequency-domain relative positions of the front loaded DMRS on the first transmission according to DCI. The frequency-domain relative position of the front loaded DMRS on the first transmission is uniquely determined. Based on this and the predetermined rule, the terminal device can infer that the frequency-domain relative positions of the front loaded DMRS in the second, third, . . . , transmissions.

Case 2: The frequency-domain relative positions of the front loaded DMRS on the at least two transmissions are different, and the frequency-domain relative positions of the additional DMRS on the at least two transmissions are same.

Here, Case 2 is applicable to a scenario where the network device configures the front loaded DMRS and the additional DMRS for repetitive transmissions, and the additional DMRS is carried in each of the repetitive transmissions.

It should be noted that, for the example in which the frequency-domain relative positions of the front loaded DMRS on the at least two transmissions are different, reference may be made to the example in Case 1, and details thereof will be omitted here.

Optionally, the equation, Table 8 and Table 9 in Case 1 are also applicable to the additional DMRS. For example, for DMRS configuration type 1, for the frequency-domain positions of the additional DMRS on the repetitive transmissions, the frequency-domain relative positions in the repetitive transmissions are the RE positions of $\{1, 3, 5, 7, 9, 11\}$ in one RB.

Optionally, the frequency-domain relative positions of the additional DMRS on the repetitive transmissions may be determined according to higher layer signaling and/or DCI. For example, the network device may establish a correspondence between DMRS configuration types and frequency-domain relative positions of the additional DMRS. Based on this, the terminal device may determine the frequency-domain relative positions of the additional DMRS on the repetitive transmissions based on the DMRS configuration type. In another example, the network device may establish a correspondence between DCI and the frequency-domain relative positions of the additional DMRS. Based on this, the terminal device may determine the frequency-domain relative positions of the additional DMRS on the repetitive transmissions based on the DCI. In another example, the frequency-domain relative positions of the additional DMRS on the repetitive transmissions may be jointly determined according to the DCI and the DMRS configuration type.

It should be noted that the frequency-domain relative positions of the front loaded DMRS and the additional DMRS on the repetitive transmissions can be jointly indicated by high-layer signaling. For example, the frequency-domain relative positions of the front loaded DMRS and the additional DMRS on the repetitive transmissions can be indicated by each of one or more higher layer signaling. Alternatively, the frequency-domain relative positions of the front loaded DMRS and the additional DMRS on the repetitive transmissions may be jointly indicated by DCI. For example, the frequency-domain relative positions of the front loaded DMRS and the additional DMRS on the repetitive transmissions may be indicated by each of one or more DCI. Alternatively, the frequency-domain relative positions of the front loaded DMRS and the additional DMRS on the repetitive transmissions may be jointly indicated by higher layer signaling and DCI. For example, the frequency-domain relative positions of the front loaded DMRS and the additional DMRS on the repetitive transmissions can be indicated by each of one or more higher layer signaling and one or more DCI. The present disclosure is not limited to any of these examples.

Optionally, the frequency-domain relative position of the additional DMRS on the first transmission in the repetitive transmissions may be determined according to higher layer signaling and/or DCI. The frequency-domain relative positions of the additional DMRS on non-first transmissions may be determined according to a predetermined rule. For example, the network device may establish a correspondence between DMRS configuration types and frequency-domain relative positions of the additional DMRS in the first transmission. Based on this, the terminal device may determine the frequency-domain relative position of the additional DMRS in the first transmission. Further, it is assumed that the above predetermined rule specifies that the frequency-domain relative positions of the additional DMRS in the non-first transmissions are the same as that in the first transmission. Based on this, the frequency-domain relative positions of the additional DMRS on the non-first transmissions can be determined. In another example, the network device may establish a correspondence between DCI and frequency-domain relative positions of the additional DMRS in the first transmission. Based on this, the terminal device may determine the frequency-domain relative position of the additional DMRS in the first transmission based on the DCI. Further, it is assumed that the above predetermined rule specifies that the frequency-domain relative positions of the additional DMRS in the non-first transmissions are the same as that in the first transmission. Based on this, the frequency-domain relative positions of the additional DMRS on the non-first transmissions can be determined. In another example, the frequency-domain relative position of the additional DMRS on the first transmission may be jointly determined according to the DCI and the DMRS configuration type. Further, it is assumed that the above predetermined rule specifies that the frequency-domain relative positions of the additional DMRS in the non-first transmissions are the same as that in the first transmission. Based on this, the frequency-domain relative positions of the additional DMRS on the non-first transmissions can be determined.

It should be noted that the frequency-domain relative positions of the front loaded DMRS and the additional DMRS on the first transmission can be jointly indicated by higher layer signaling. For example, the frequency-domain relative position of the front loaded DMRS and the additional DMRS on the first transmission can be indicated by each of one or more higher layer signaling. Alternatively, the frequency-domain relative positions of the front loaded DMRS and the additional DMRS on the first transmission can be jointly indicated by DCI. For example, the frequency-domain relative positions of the front loaded DMRS and the additional DMRS on the first transmission can be indicated by each of one or more DCI. Alternatively, the frequency-domain relative positions of the front loaded DMRS and the additional DMRS on the first transmission may be jointly indicated by higher layer signaling and DCI. For example, the frequency-domain relative positions of the front loaded DMRS and the additional DMRS on the first transmission can be indicated by each of one or more higher layer signaling and one or more DCI. The present disclosure is not limited to any of these examples.

Case 3: The frequency-domain relative positions of the front loaded DMRS on the at least two transmissions are same, and the frequency-domain relative positions of the additional DMRS on the at least two transmissions are different.

Here, Case 3 is applicable to a scenario in which the network device configures the front loaded DMRS and the additional DMRS for repetitive transmissions, and the additional DMRS is carried in each of the repetitive transmissions.

Assuming that DMRS configuration type 1 is adopted, for the front loaded DMRS, the front loaded DMRS on at least two transmissions in the repetitive transmissions are $\{0, 2, 4, 6, 8, 10\}$ in one RB.

Optionally, the frequency-domain relative positions of the front loaded DMRS on the repetitive transmissions may be determined according to higher layer signaling and/or DCI. For example, for DMRS configuration type 1, the frequency-domain relative position of the front loaded DMRS is the RE positions of $\{0, 2, 4, 6, 8, 10\}$ in each transmission of the PDSCH. In another example, the DCI transmitted by the network device to the terminal device can be used to uniquely determine the frequency-domain relative positions of the front loaded DMRS on the repetitive transmissions. Based on this, the terminal device can determine the frequency-domain relative positions of the front loaded DMRS on the repetitive transmissions according to the DCI transmitted by the network device. In another example, the terminal device can determine a number of sets of frequency-domain relative positions of the front loaded DMRS on the repetitive transmissions according to the higher layer signaling, and further, the terminal device can uniquely determine the frequency-domain relative positions of the front loaded DMRS on the repetitive transmissions from the number of sets of frequency-domain relative positions of the front loaded DMRS on the repetitive transmissions according to the DCI.

Optionally, the frequency-domain relative position of the front loaded DMRS on the first transmission in the repetitive transmissions may be determined according to higher layer signaling and/or DCI. The frequency-domain relative positions of the front loaded DMRS on non-first transmissions may be determined according to a predetermined rule. For example, for DMRS configuration type 1, the frequency-domain relative position of the front loaded DMRS on the first transmission is the RE positions of $\{0, 2, 4, 6, 8, 10\}$ in the first transmission of the PDSCH. The predetermined rule negotiated between the terminal device and the network device is: the frequency-domain relative positions of the front loaded DMRS on the non-first transmissions are the same as the frequency-domain relative position of the front loaded DMRS on the first transmission. Based on this, the frequency-domain relative positions of the front loaded DMRS on the non-first transmissions can be derived. In another example, the DCI transmitted by the network device to the terminal device can be used to uniquely determine the frequency-domain relative position of the front loaded DMRS on the first transmission, and then the frequency-domain relative positions of the front loaded DMRS on the non-first transmissions can be inferred according to a predetermined rule. In another example, the terminal device can determine a number of sets of frequency-domain relative position of the front loaded DMRS on the first transmission according to higher layer signaling, and then infer the frequency-domain relative positions of the front loaded DMRS on the non-first transmissions according to the predetermined rule.

Figure 18:
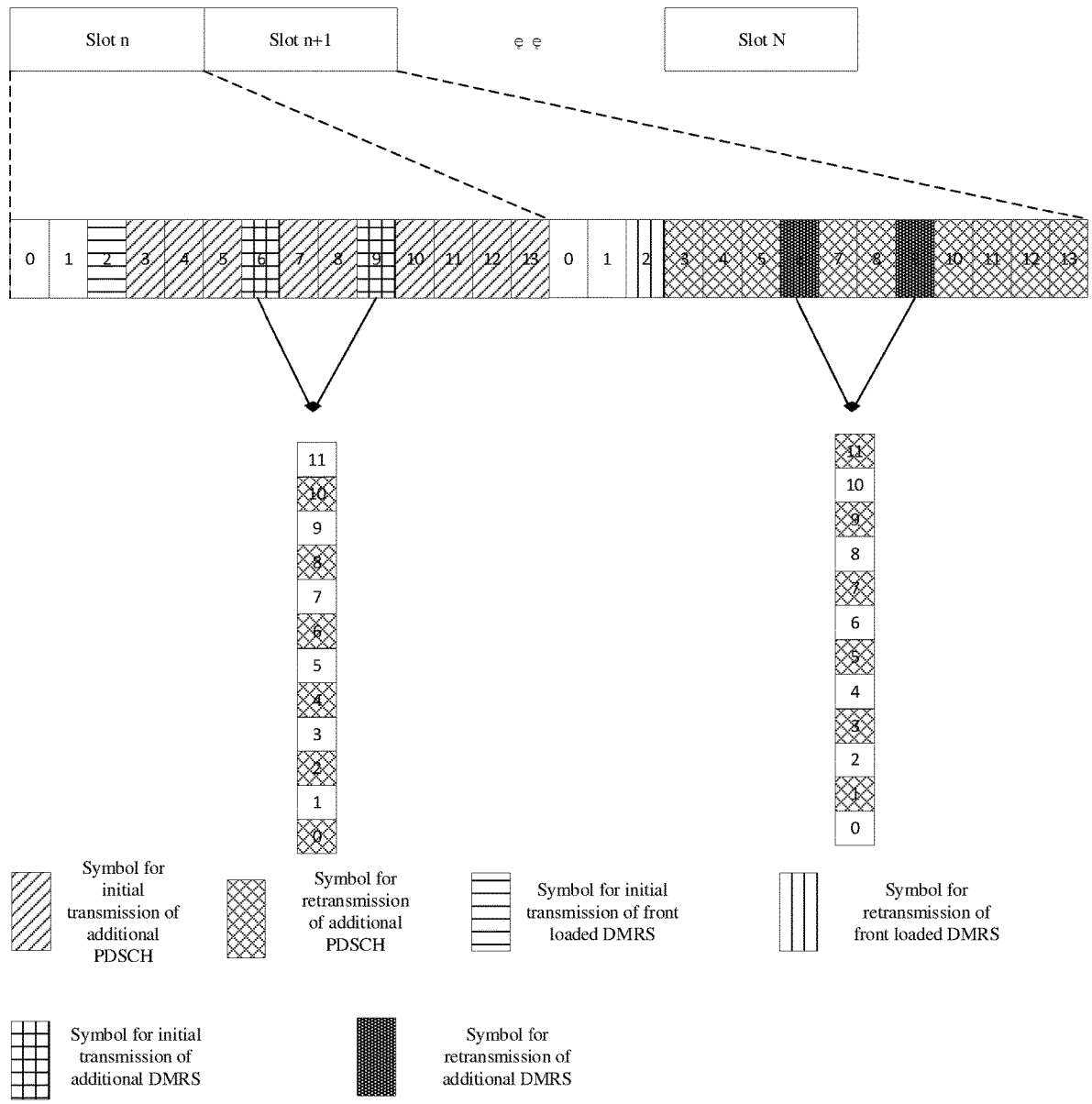
FIG. 18 is a schematic diagram showing a frequency-domain relative position of an additional DMRS according to an embodiment of the present disclosure.

As described in Case 3, the frequency-domain relative positions of the additional DMRSs on the at least two transmissions are different. Exemplarily, FIG. 18 is a schematic diagram showing the frequency-domain relative positions of the additional DMRS according to an embodiment of the present disclosure. As shown in FIG. 18, DMRS configuration type 1 is adopted. For the additional DMRS, in the first transmission, the RE positions of the additional DMRS in the RB are $\{0, 2, 4, 6, 8, 10\}$. In the second transmission, the RE positions of the additional DMRS in one RB are $\{1, 3, 5, 7, 9, 11\}$.

Optionally, the frequency-domain relative positions of the additional DMRS on the repetitive transmissions are determined according to higher layer signaling and/or DCI. For example, the network device can establish a correspondence between DMRS configuration types and frequency-domain relative positions of the additional DMRS. Based on this, the terminal device can determine the frequency-domain relative positions of the additional DMRS on the repetitive transmissions, and the frequency-domain relative positions of the additional DMRS on the repetitive transmissions are different. In another example, the network device may establish a correspondence between DCI and frequency-domain relative positions of the additional DMRS, and based on this, the terminal device may determine the frequency-domain relative positions of the additional DMRS on the repetitive transmissions based on the DCI, and the frequency-domain relative positions of the additional DMRS on the repetitive transmissions. In another example, the frequency-domain relative positions of the additional DMRS on the repetitive transmissions are jointly determined according to DCI and DMRS configuration type.

It should be noted that the frequency-domain relative positions of the front loaded DMRS and the additional DMRS on the repetitive transmissions can be jointly indicated by high-layer signaling. For example, the frequency-domain relative positions of the front loaded DMRS and the additional DMRS on the repetitive transmissions can be indicated by each of one or more higher layer signaling. Alternatively, the frequency-domain relative positions of the front loaded DMRS and the additional DMRS on the repetitive transmissions may be jointly indicated by DCI. For example, the frequency-domain relative positions of the front loaded DMRS and the additional DMRS on the repetitive transmissions may be indicated by each of one or more DCI. Alternatively, the frequency-domain relative positions of the front loaded DMRS and the additional DMRS on the repetitive transmissions may be jointly indicated by higher layer signaling and DCI. For example, the frequency-domain relative positions of the front loaded DMRS and the additional DMRS on the repetitive transmissions can be indicated by each of one or more higher layer signaling and one or more DCI. The present disclosure is not limited to any of these examples.

Optionally, the frequency-domain relative position of the additional DMRS on the first transmission in the repetitive transmissions may be determined according to higher layer signaling and/or DCI. The frequency-domain relative positions of the additional DMRS on non-first transmissions may be determined according to a predetermined rule. For example, the network device may establish a correspondence between DMRS configuration types and frequency-domain relative positions of the additional DMRS in the first transmission. Based on this, the terminal device may determine the frequency-domain relative position of the additional DMRS in the first transmission. Further, it is assumed that the above predetermined rule specifies that if the above repetitive transmissions include N transmissions, and the frequency-domain relative position of the front loaded DMRS signal in the i-th transmission includes RE n, then the frequency-domain relative position of the front loaded DMRS signal in the (i+1)-th transmission of the N transmissions includes RE n+k, where i is a positive integer, n is an integer, and k is a positive integer. Based on this, the frequency-domain relative positions of the additional DMRS on the non-first transmissions can be determined. In another example, the network device may establish a correspondence between DCI and frequency-domain relative positions of the additional DMRS in the first transmission. Based on this, the terminal device may determine the frequency-domain relative position of the additional DMRS in the first transmission based on the DCI. Further, it is assumed that the above predetermined rule specifies that if the above repetitive transmissions include N transmissions, and the frequency-domain relative position of the front loaded DMRS signal in the i-th transmission includes RE n, then the frequency-domain relative position of the front loaded DMRS signal in the (i+1)-th transmission of the N transmissions includes RE n+k, where i is a positive integer, n is an integer, and k is a positive integer. Based on this, the frequency-domain relative positions of the additional DMRS on the non-first transmissions can be determined. In another example, the frequency-domain relative position of the additional DMRS on the first transmission may be jointly determined according to the DCI and the DMRS configuration type. Further, it is assumed that the above predetermined rule specifies that that if the above repetitive transmissions include N transmissions, and the frequency-domain relative position of the front loaded DMRS signal in the i-th transmission includes RE n, then the frequency-domain relative position of the front loaded DMRS signal in the (i+1)-th transmission of the N transmissions includes RE n+k, where i is a positive integer, n is an integer, and k is a positive integer. Based on this, the frequency-domain relative positions of the additional DMRS on the non-first transmissions can be determined.

It should be noted that the frequency-domain relative positions of the front loaded DMRS and the additional DMRS on the first transmission can be jointly indicated by higher layer signaling. For example, the frequency-domain relative position of the front loaded DMRS and the additional DMRS on the first transmission can be indicated by each of one or more higher layer signaling. Alternatively, the frequency-domain relative positions of the front loaded DMRS and the additional DMRS on the first transmission can be jointly indicated by DCI. For example, the frequency-domain relative positions of the front loaded DMRS and the additional DMRS on the first transmission can be indicated by each of one or more DCI. Alternatively, the frequency-domain relative positions of the front loaded DMRS and the additional DMRS on the first transmission may be jointly indicated by higher layer signaling and DCI. For example, the frequency-domain relative positions of the front loaded DMRS and the additional DMRS on the first transmission can be indicated by each of one or more higher layer signaling and one or more DCI. The present disclosure is not limited to any of these examples.

Case 4: The frequency-domain relative positions of the front loaded DMRS on the at least two transmissions are different, and the frequency-domain relative positions of the additional DMRS on the at least two transmissions are different.

Here, Case 4 is applicable to a scenario in which the network device configures the front loaded DMRS and the additional DMRS for the repetitive transmissions, and the additional DMRS is carried in each of the repetitive transmissions.

It should be noted that, for the example in which the frequency-domain relative positions of the front loaded DMRS on the at least two transmissions are different, reference may be made to the example in Case 1, and details thereof will be omitted here. For the example in which the frequency-domain relative positions of the additional DMRS on the at least two transmissions are different, reference may be made to the example in Case 3, and details thereof will be omitted here.

Case 5: The frequency-domain relative positions of the front loaded DMRS on the at least two transmissions are same, there is an additional DMRS in at least one of the at least two transmissions, and there is no additional DMRS in at least one of the at least two transmissions.

Case 5 is applicable to the following scenario: the network device configures the front loaded DMRS and the additional DMRS for the repetitive transmissions, and some of the repetitive transmissions carry the additional DMRS while others do not.

It should be noted that there is an additional DMRS in at least one of the at least two transmissions, such that the at least one transmission involves the frequency-domain relative position of the additional DMRS. There is no additional DMRS in at least one of the at least two transmissions, such that the at least one transmission does not involve the frequency-domain relative position of the additional DMRS. In summary, this case can be understood as: the frequency-domain relative positions of the additional DMRS in the at least two transmissions are different.

For the example in which the frequency-domain relative positions of the front loaded DMRS on the at least two transmissions are same, reference may be made to the example in Case 3, and details thereof will be omitted here.

Exemplarily, in at least one of the at least two transmissions, DMRS configuration type 1 is adopted, and the RE positions of the additional DMRS in one RB are {0, 2, 4, 6, 8, 10}. There is no transmission of the additional DMRS in at least one of the at least two transmissions, that is, there is no RE where the additional DMRS is located.

Optionally, the frequency-domain relative position of the additional DMRS on the repetitive transmissions may be determined according to higher layer signaling and/or DCI. For details, reference can be made to Case 2 and Case 3, and description thereof will be omitted.

Optionally, the frequency-domain relative position of the additional DMRS on the first transmission in the repetitive transmissions may be determined according to higher layer signaling and/or DCI, and the frequency-domain relative positions of the additional DMRS on non-first transmissions may be determined according to a predetermined rule. For details, reference can be made to Case 2 and Case 3, and description thereof will be omitted.

Case 6: The frequency-domain relative positions of the front loaded DMRS in the at least two transmissions are different, there is an additional DMRS in at least one of the at least two transmissions, and there is no additional DMRS in at least one of the at least two transmissions.

Case 6 is applicable to the following scenario: the network device configures the front loaded DMRS and the additional DMRS for the repetitive transmissions, and some of the repetitive transmissions carry the additional DMRS while others do not.

It should be noted that there is an additional DMRS in at least one of the at least two transmissions, such that the at least one transmission involves the frequency-domain relative position of the additional DMRS. There is no additional DMRS in at least one of the at least two transmissions, such that the at least one transmission does not involve the frequency-domain relative position of the additional DMRS. In summary, this case can be understood as: the frequency-domain relative positions of the additional DMRS in the at least two transmissions are different.

For the example in which the frequency-domain relative positions of the front loaded DMRS in the at least two transmissions are different, reference may be made to the example in Case 1, and details thereof will be omitted here.

For the example in which there is an additional DMRS in at least one of the at least two transmissions and there is no additional DMRS in at least one of the at least two transmissions, reference may be made to the example in Case 5, and details thereof will be omitted here.

Optionally, the frequency-domain relative positions of the additional DMRS on the repetitive transmissions may be determined according to higher layer signaling and/or DCI. For details, reference can be made to Case 2 and Case 3, and description thereof will be omitted.

Optionally, the frequency-domain relative position of the additional DMRS on the first transmission in the repetitive transmissions may be determined according to higher layer signaling and/or DCI, and the frequency-domain relative positions of the additional DMRS on non-first transmissions may be determined according to a predetermined rule. For details, reference can be made to Case 2 and Case 3, and description thereof will be omitted.

Case 7: There is a front loaded DMRS and/or an additional DMRS in at least one of the at least two transmissions, and there is no front loaded DMRS and/or no additional DMRS in at least one of the at least two transmissions.

Exemplarily, there is a front loaded DMRS in at least one of the at least two transmissions, and there is no front loaded DMRS in at least one of the at least two transmissions.

It should be noted that there is a front loaded DMRS in at least one of the at least two transmissions, such that the at least one transmission involves the frequency-domain relative position of the front loaded DMRS. There is no front loaded DMRS in at least one of the at least two transmissions, such that the at least one transmission does not involve the frequency-domain relative position of the front loaded DMRS. In summary, this case can be understood as: the frequency-domain relative positions of the front loaded DMRS in the at least two transmissions are different. For the example in which the frequency-domain relative positions of the front loaded DMRS in the at least two transmissions are different, reference may be made to the example in Case 1, and details thereof will be omitted here.

Exemplarily, there is a front loaded DMRS and an additional DMRS in at least one of the at least two transmissions, and there is no front loaded DMRS and no additional DMRS in at least one of the at least two transmissions.

It should be noted that there are front loaded and additional DMRSs in at least one of the at least two transmissions, such that the at least one transmission involves the frequency-domain relative positions of the front loaded and additional DMRSs. There are no front loaded and additional DMRSs in at least one of the at least two transmissions, such that the at least one transmission does not involve the frequency-domain relative positions of the front loaded and additional DMRSs. In summary, this case can be understood as: the frequency-domain relative positions of the front loaded DMRS on the at least two transmissions are different, and the frequency-domain relative positions of the additional DMRS on the at least two transmissions are different. Therefore, reference can be made to the example in Case 4, and details thereof will be omitted here.

It is worth mentioning that Case 7 is applicable to the following scenarios: when the number of REs allocated in the frequency domain resource of the data channel is relatively small, e.g., as two REs, for two consecutive retransmissions, since they are close to each other in the time domain, the latter transmission may contain no DMRS and the DMRS of the earlier transmission is used for channel estimation. This can reduce the overhead of DMRS.

It should be noted that, in the present disclosure, both the terminal device and the network device can obtain the frequency-domain relative positions of the reference signal, and the frequency-domain relative positions of the reference signal obtained by the terminal device and the network device present the same result. Therefore, for the frequency-domain relative positions of the reference signal obtained by the network device, reference can be made to those obtained by the terminal device. The difference is that for the terminal device, the network device can configure the terminal device with the frequency-domain relative positions of the reference signal via higher layer signaling and/or DCI. For the network device, the frequency-domain relative positions of the reference signal can be determined internally according to higher layer signaling or other pre-configuration schemes.

To summarize, in the scenario of repetitive transmissions of the data channel, the present disclosure provides a method for determining the frequency-domain relative positions of the DMRS in the repetitive transmissions of the data channel. Further, between different repetitive transmissions of the data channel, the relative frequency-domain resource positions of the frequency-domain resource positions where the DMRS is located are different in the frequency-domain resource of the data channel, which can provide as many relative positions of the DMRS as possible in the frequency domain resource of the data channel. It is beneficial to perform channel estimation on more relative frequency-domain resources and improve the demodulation performance of the data channel.

Embodiment 3

Figure 19:
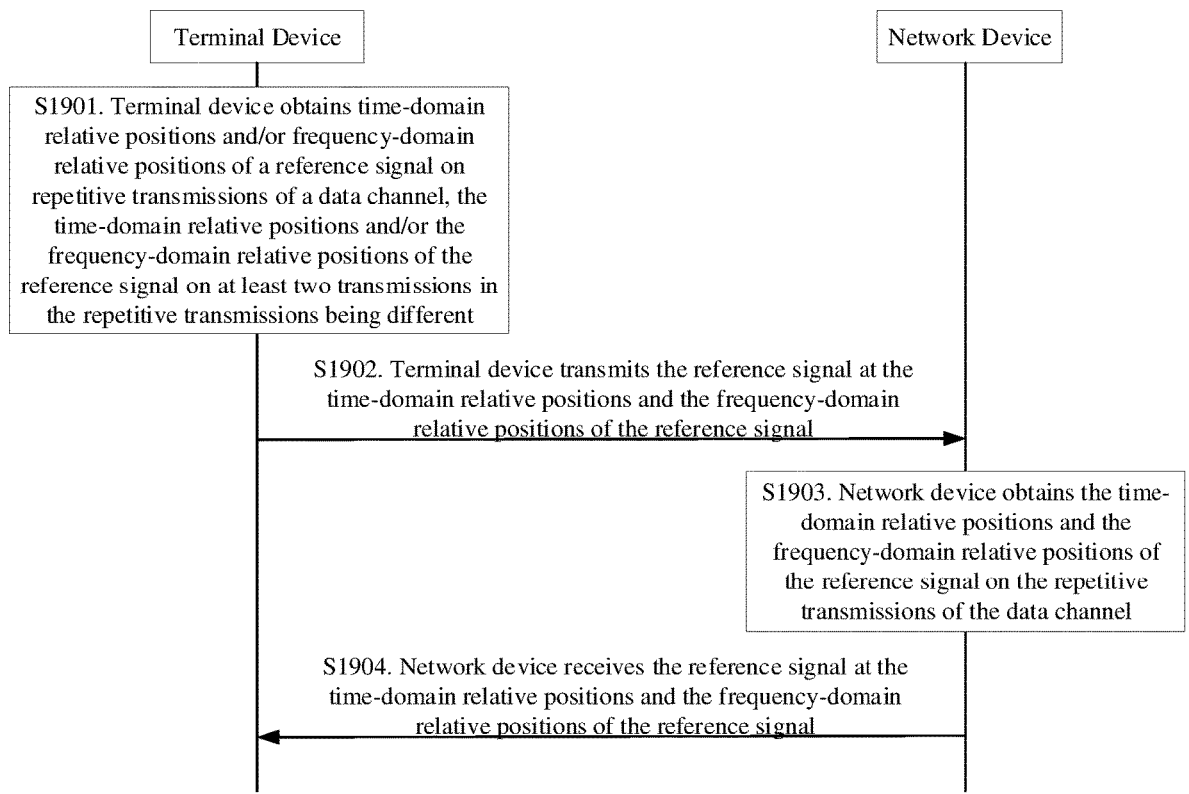
FIG. 19 is an interaction flowchart of a wireless communication method according to another embodiment of the present disclosure.

For repetitive transmissions of an uplink data channel, FIG. 19 is an interaction flowchart of a wireless communication method according to another embodiment of the present disclosure, and the method includes the following steps.

At step S1901, a terminal device obtains time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

Optionally, at step S1902, the terminal device transmits the reference signal at the time-domain relative positions and the frequency-domain relative positions of the reference signal.

At step S1903, a network device obtains the time-domain relative positions and the frequency-domain relative positions of the reference signal on the repetitive transmissions of the data channel.

Optionally, at step S1904, the network device receives the reference signal at the time-domain relative positions and the frequency-domain relative positions of the reference signal.

It should be noted that that the present disclosure is not limited to the order of the above step S1903 and the steps S1901 and S1902. For example, the step S1903 may be performed before the step S1901, or may be performed between the step S1902 and the step S1903.

Optionally, the data channel in the steps S1901 to S1904 may be PUSCH.

Figure 20:
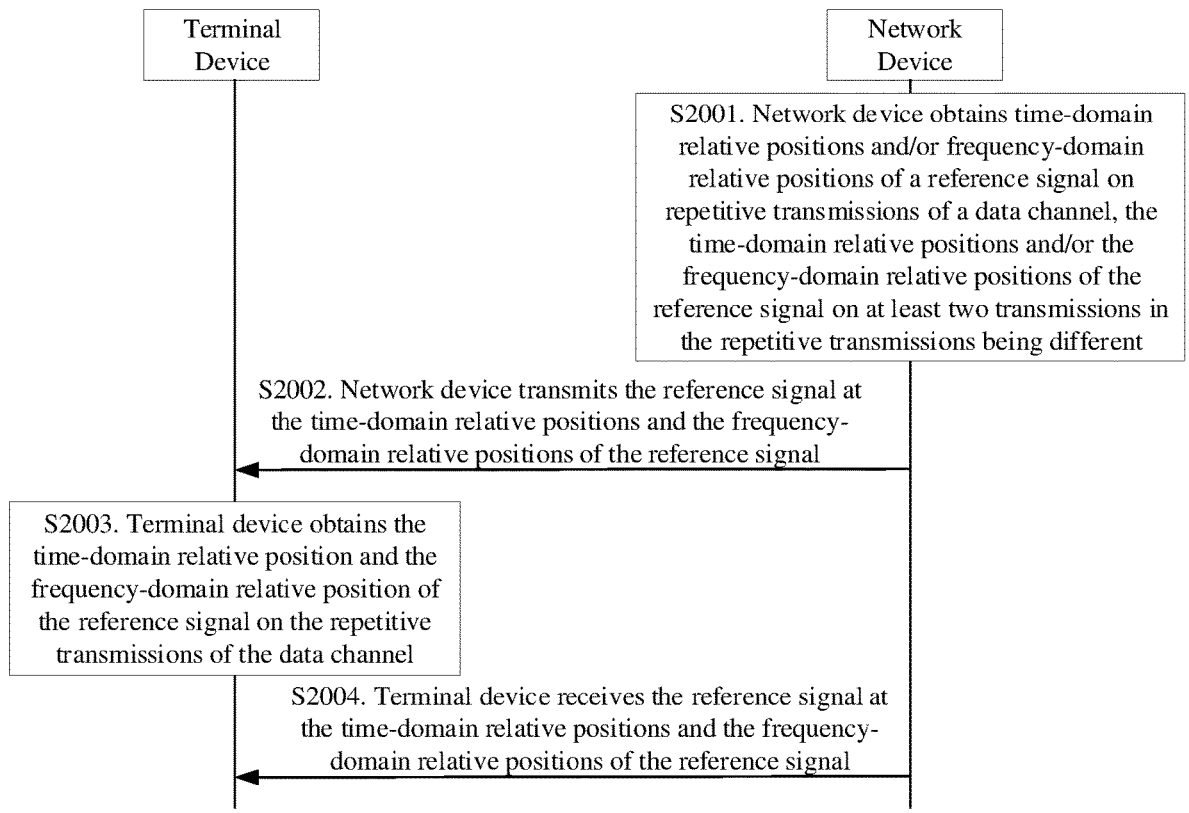
FIG. 20 is an interaction flowchart of a wireless communication method according to yet another embodiment of the present disclosure.

For repetitive transmissions of a downlink data channel, FIG. 20 is an interaction flowchart of a wireless communication method according to another embodiment of the present disclosure, and the method includes the following steps.

At step S2001, a network device obtains time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

Optionally, at step S2002, the network device transmits the reference signal at the time-domain relative positions and the frequency-domain relative positions of the reference signal.

At step S2003, a terminal device obtains the time-domain relative position and the frequency-domain relative position of the reference signal on the repetitive transmissions of the data channel.

Optionally, at step S2004, the terminal device receives the reference signal at the time-domain relative positions and the frequency-domain relative positions of the reference signal.

It should be noted that the present disclosure is not limited to the order of the above step S2003 and the steps S2001 and S2002. For example, the step S2003 may be performed before the step S2001, or may be performed between the step S2002 and the step S2003.

Optionally, the data channel in the steps S2001 to S2004 may be PDSCH.

Optionally, the network device may configure a front loaded DMRS for the repetitive transmissions, or the network device may configure a front loaded DMRS and an additional DMRS for the repetitive transmissions, and the additional DMRS is carried in each of the repetitive transmissions, or the network device may configure a front loaded DMRS and an additional DMRS for the repetitive transmissions, and some of the repetitive transmissions carry the additional DMRS while others do not. Based on this, for the time-domain relative positions of the reference signal on at least two transmissions in the repetitive transmissions, reference can be made to Embodiment 1, and for the frequency-domain relative positions of the reference signal on at least two transmissions in the repetitive transmissions, reference can be made to Embodiment 2, and details thereof will be omitted here. For the reference signal, the time-domain relative positions and the frequency-domain relative positions of the reference signal on at least two transmissions in the repetitive transmissions are different, which includes the following cases.

Case 1: The time-domain relative positions of the front loaded DMRS on the at least two transmissions are different, and the frequency-domain relative positions of the front loaded DMRS on the at least two transmissions are different.

Case 2: The time-domain relative positions of the front loaded DMRS on the at least two transmissions are different, the frequency-domain relative positions of the front loaded DMRS on the at least two transmissions are different, the time-domain relative positions of the additional DMRS on the at least two transmissions are same, and the frequency-domain relative positions of the front loaded DMRS on the at least two transmissions are same.

Case 3: The time-domain relative positions of the front loaded DMRS on the at least two transmissions are same, the frequency-domain relative positions of the front loaded DMRS on the at least two transmissions are same, the time-domain relative positions of the additional DMRS on the at least two transmissions are different, and the frequency-domain relative positions of the additional DMRS on the at least two transmissions are different.

Case 4: The time-domain relative positions of the front loaded DMRS on the at least two transmissions are different, the frequency-domain relative positions of the front loaded DMRS on the at least two transmissions are different, the time-domain relative positions of the additional DMRS on the at least two transmissions are different, and the frequency-domain relative positions of the additional DMRS on the at least two transmissions are different.

Case 5: The time-domain relative positions of the front loaded DMRS on the at least two transmissions are same, and the frequency-domain relative positions of the front loaded DMRS on the at least two transmissions are same, there is an additional DMRS on at least one of the at least two transmissions, and there is no additional DMRS on at least one of the at least two transmissions.

Case 6: The time-domain relative positions of the front loaded DMRS on the at least two transmissions are different, the frequency-domain relative positions of the front loaded DMRS on the at least two transmissions are different, there is an additional DMRS on at least one of the at least two transmissions, and there is no additional DMRS on at least one of the at least two transmissions.

Case 7: There is a front loaded DMRS and/or an additional DMRS in at least one of the at least two transmissions, and there is no front loaded DMRS and/or no additional DMRS in at least one of the at least two transmissions.

Of course, there may be other cases within the scope of the present disclosure, as long as the time-domain relative positions and/or the frequency-domain relative positions of the front loaded and/or additional DMRSs in the repetitive transmissions are different.

In summary, the present disclosure provides a method for obtaining time/frequency relative positions of a DMRS on repetitive transmissions of a data channel in a scenario of repetitive transmissions of the data channel. Further, between different repetitive transmissions of the data channel, the time/frequency relative positions where the DMRS is located are different among relative time/frequency resource positions in time/frequency resources of the data channel. This provides as many relative positions of the DMRS as possible in the time/frequency resources of the data channel, which facilitates performing channel estimation on more relative time/frequency resources to improve demodulation performance of the data channel.

The method embodiments of the present disclosure have been described in detail above with reference to FIGS. 6-20, and apparatus embodiments of the present disclosure will be described in detail below with reference to FIGS. 21-24. It can be appreciated that the apparatus embodiments and the method embodiments correspond to each other, and for similar description, reference can be made to the method embodiments.

Figure 21:
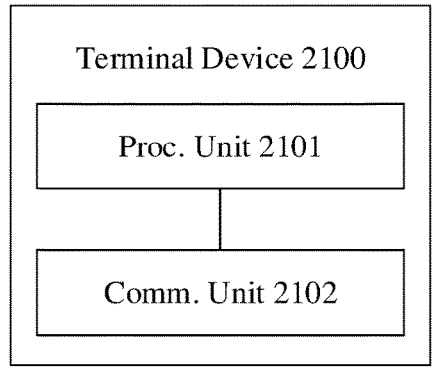
FIG. 21 shows a schematic block diagram of a terminal device 2100 according to an embodiment of the present disclosure.

FIG. 21 shows a schematic block diagram of a terminal device 2100 according to an embodiment of the present disclosure. As shown in FIG. 21, the terminal device 2100 includes:

a processing unit 2101 configured to obtain time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

Optionally, the reference signal may include: a front loaded Demodulation Reference Signal (DMRS) and/or an additional DMRS.

Optionally, the time-domain relative positions of the front loaded DMRS on the at least two transmissions are different.

Alternatively, the time-domain relative positions of the front loaded DMRS on the at least two transmissions are different, and the time-domain relative positions of the additional DMRS on the at least two transmissions are same.

Alternatively, the time-domain relative positions of the front loaded DMRS on the at least two transmissions are same, and the time-domain relative positions of the additional DMRS on the at least two transmissions are different.

Alternatively, the time-domain relative positions of the front loaded DMRS on the at least two transmissions are different, and the time-domain relative positions of the additional DMRS on the at least two transmissions are different.

Alternatively, the time-domain relative positions of the front loaded DMRS in the at least two transmissions are same, there is an additional DMRS in at least one of the at least two transmissions, and there is no additional DMRS in at least one of the at least two transmissions.

Alternatively, the time-domain relative positions of the front loaded DMRS in the at least two transmissions are different, there is an additional DMRS in at least one of the at least two transmissions, and there is no additional DMRS in at least one of the at least two transmissions.

Optionally, the frequency-domain relative positions of the front loaded DMRS on the at least two transmissions are different.

Alternatively, the frequency-domain relative positions of the front loaded DMRS on the at least two transmissions are different, and the frequency-domain relative positions of the additional DMRS on the at least two transmissions are same.

Alternatively, the frequency-domain relative positions of the front loaded DMRS on the at least two transmissions are same, and the frequency-domain relative positions of the additional DMRS on the at least two transmissions are different.

Alternatively, the frequency-domain relative positions of the front loaded DMRS on the at least two transmissions are different, and the frequency-domain relative positions of the additional DMRS on the at least two transmissions are different.

Alternatively, the frequency-domain relative positions of the front loaded DMRS in the at least two transmissions are same, there is an additional DMRS in at least one of the at least two transmissions, and there is no additional DMRS in at least one of the at least two transmissions.

Alternatively, the frequency-domain relative positions of the front loaded DMRS in the at least two transmissions are different, there is an additional DMRS in at least one of the at least two transmissions, and there is no additional DMRS in at least one of the at least two transmissions.

Optionally, there is a front loaded DMRS and/or an additional DMRS on at least one of the at least two transmissions, and there is no front loaded DMRS and/or no additional DMRS in at least one of the at least two transmissions.

Optionally, the time-domain relative positions and/or the frequency-domain relative positions of the reference signal on the repetitive transmissions are determined according to higher layer signaling and/or Downlink Control Information (DCI).

Optionally, the time-domain relative position and/or the frequency-domain relative position of the reference signal on a first transmission in the repetitive transmissions is determined according to higher layer signaling and/or Downlink Control Information (DCI), and the domain relative positions and/or the frequency-domain relative positions of the reference signal on non-first transmissions in the repetitive transmissions are determined according to a predetermined rule.

Optionally, the repetitive transmissions are within one time unit or within different time units.

Optionally, the time unit is one time slot.

Optionally, the data channel is a Physical Downlink Shared Channel (PDSCH), or a Physical Uplink Shared Channel (PUSCH).

Optionally, for each of the repetitive transmissions, the time-domain relative position of the reference signal on the transmission is relative to a time-domain position of the data channel, and the frequency-domain relative position of the reference signal on the transmission is relative to a frequency-domain position of the data channel on the transmission.

Optionally, the terminal device 2100 further includes: a communication unit 2102 configured to communicate with a network device.

Optionally, in some embodiments, the above-mentioned communication unit may be a communication interface or a transceiver, or an input/output interface of a communication chip or a system-on-chip. The above processing unit may be one or more processors.

It can be appreciated that the terminal device 2100 according to the embodiment of the present disclosure may correspond to the terminal device in the method embodiment of the present disclosure, and the above and other operations and/or functions of the various units in the terminal device 2100 are provided for implementing the corresponding processes performed by the terminal device in the above method embodiments, and details thereof will be omitted here for brevity.

Figure 22:
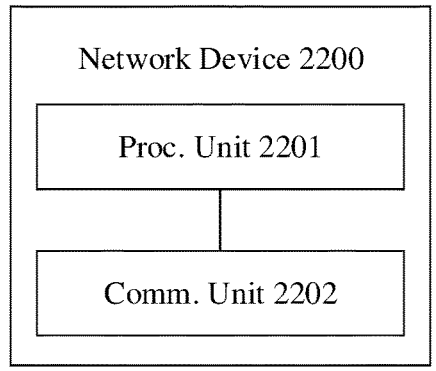
FIG. 22 shows a schematic block diagram of a network device 2200 according to an embodiment of the present disclosure.

FIG. 22 shows a schematic block diagram of a network device 2200 according to an embodiment of the present disclosure. As shown in FIG. 22, the network device 2200 belongs to a first network, and the network device 2200 includes:

a processing unit 2201 configured to obtain time-domain relative positions and/or frequency-domain relative positions of a reference signal on repetitive transmissions of a data channel. The time-domain relative positions and/or the frequency-domain relative positions of the reference signal on at least two transmissions in the repetitive transmissions are different.

Optionally, the reference signal may include: a front loaded Demodulation Reference Signal (DMRS) and/or an additional DMRS.

Optionally, the time-domain relative positions of the front loaded DMRS on the at least two transmissions are different.

Alternatively, the time-domain relative positions of the front loaded DMRS on the at least two transmissions are different, and the time-domain relative positions of the additional DMRS on the at least two transmissions are same.

Alternatively, the time-domain relative positions of the front loaded DMRS on the at least two transmissions are same, and the time-domain relative positions of the additional DMRS on the at least two transmissions are different.

Alternatively, the time-domain relative positions of the front loaded DMRS on the at least two transmissions are different, and the time-domain relative positions of the additional DMRS on the at least two transmissions are different.

Alternatively, the time-domain relative positions of the front loaded DMRS in the at least two transmissions are same, there is an additional DMRS in at least one of the at least two transmissions, and there is no additional DMRS in at least one of the at least two transmissions.

Alternatively, the time-domain relative positions of the front loaded DMRS in the at least two transmissions are different, there is an additional DMRS in at least one of the at least two transmissions, and there is no additional DMRS in at least one of the at least two transmissions.

Optionally, the frequency-domain relative positions of the front loaded DMRS on the at least two transmissions are different.

Alternatively, the frequency-domain relative positions of the front loaded DMRS on the at least two transmissions are different, and the frequency-domain relative positions of the additional DMRS on the at least two transmissions are same.

Alternatively, the frequency-domain relative positions of the front loaded DMRS on the at least two transmissions are same, and the frequency-domain relative positions of the additional DMRS on the at least two transmissions are different.

Alternatively, the frequency-domain relative positions of the front loaded DMRS on the at least two transmissions are different, and the frequency-domain relative positions of the additional DMRS on the at least two transmissions are different.

Alternatively, the frequency-domain relative positions of the front loaded DMRS in the at least two transmissions are same, there is an additional DMRS in at least one of the at least two transmissions, and there is no additional DMRS in at least one of the at least two transmissions.

Alternatively, the frequency-domain relative positions of the front loaded DMRS in the at least two transmissions are different, there is an additional DMRS in at least one of the at least two transmissions, and there is no additional DMRS in at least one of the at least two transmissions.

Optionally, there is a front loaded DMRS and/or an additional DMRS on at least one of the at least two transmissions, and there is no front loaded DMRS and/or no additional DMRS in at least one of the at least two transmissions.

Optionally, the network device further includes: a communication unit 2202 configured to transmit higher layer signaling and/or Downlink Control Information (DCI) to the terminal device, the higher layer signaling and/or DCI being used to determine the time-domain relative positions and/or the frequency-domain relative positions of the reference signal on the repetitive transmissions.

Optionally, the network device further includes: a communication unit 2202 configured to transmit higher layer signaling and/or Downlink Control Information (DCI) to the terminal device. The higher layer signaling and/or DCI is used to determine the time-domain relative position and/or the frequency-domain relative position of the reference signal on a first transmission in the repetitive transmissions. The domain relative positions and/or the frequency-domain relative positions of the reference signal on non-first transmissions in the repetitive transmissions are determined according to a predetermined rule.

Optionally, the repetitive transmissions are within one time unit or within different time units.

Optionally, the time unit is one time slot.

Optionally, the data channel is a Physical Downlink Shared Channel (PDSCH), or a Physical Uplink Shared Channel (PUSCH).

Optionally, for each of the repetitive transmissions, the time-domain relative position of the reference signal on the transmission is relative to a time-domain position of the data channel, and the frequency-domain relative position of the reference signal on the transmission is relative to a frequency-domain position of the data channel on the transmission.

Optionally, in some embodiments, the above communication unit may be a communication interface or a transceiver, or an input/output interface of a communication chip or a system-on-chip. The above processing unit may be one or more processors.

It can be appreciated that the network device 2200 according to the embodiment of the present disclosure may correspond to the network device in any of the method embodiments of the present disclosure, and the above and other operations and/or functions of the respective units in the network device 2200 are provided to implement the corresponding processes of the network device in the above method embodiments. For the sake of brevity, details thereof will be omitted here.

Figure 23:
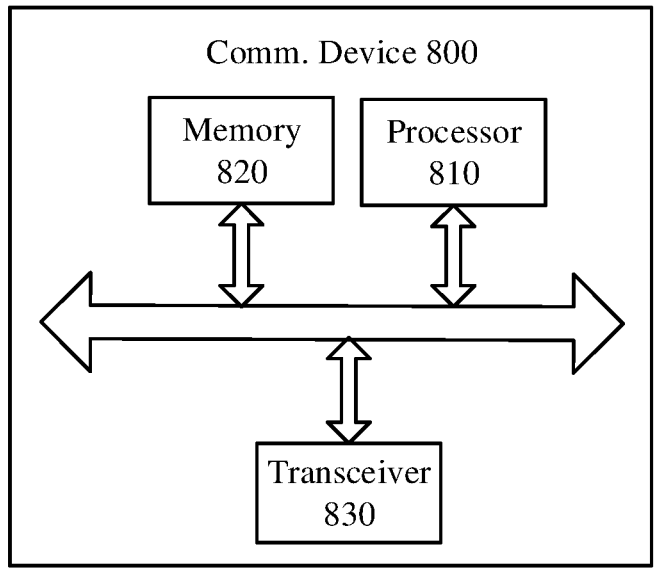
FIG. 23 is a schematic diagram showing a structure of a communication device 800 according to an embodiment of the present disclosure.

FIG. 23 is a schematic diagram showing a structure of a communication device 800 according to an embodiment of the present disclosure. The communication device 800 shown in FIG. 23 includes a processor 810, and the processor 810 can invoke and execute a computer program from a memory to implement the method in the embodiment of the present disclosure.

Optionally, as shown in FIG. 23, the communication device 800 may further include a memory 820. The processor 810 can invoke and execute a computer program from the memory 820 to implement the method in the embodiment of the present disclosure.

The memory 820 may be a separate device independent from the processor 810, or may be integrated in the processor 810.

Optionally, as shown in FIG. 23, the communication device 800 may further include a transceiver 830, and the processor 810 may control the transceiver 830 to communicate with other devices, and in particular, transmit information or data to other devices, or receive information or data transmitted by other devices.

Here, the transceiver 830 may include a transmitter and a receiver. The transceiver 830 may further include one or more antennas.

Optionally, the communication device 800 may specifically be the network device according to the embodiment of the present disclosure, and the communication device 800 may implement the corresponding processes implemented by the network device in any of the methods according to the embodiments of the present disclosure. For the sake of brevity, details thereof will be omitted here.

Optionally, the communication device 800 may specifically be the mobile terminal/terminal device according to the embodiment of the present disclosure, and the communication device 800 may implement the corresponding processes implemented by the mobile terminal/terminal device in any of the methods according to the embodiments of the present disclosure. For the sake of brevity, details thereof will be omitted here.

Figure 24:
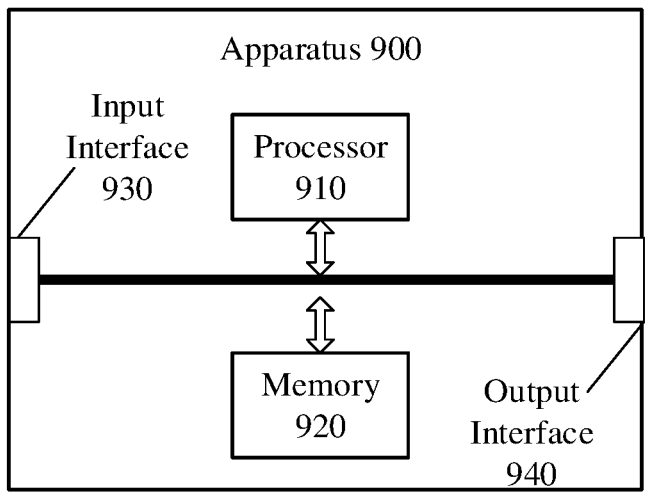
FIG. 24 is a schematic diagram showing a structure of a device according to an embodiment of the present disclosure.

FIG. 24 is a schematic diagram showing a structure of an apparatus according to an embodiment of the present disclosure. The apparatus 900 shown in FIG. 24 includes a processor 910, and the processor 910 can invoke and execute a computer program from a memory to implement the method in the embodiment of the present disclosure.

Optionally, as shown in FIG. 24, the apparatus 900 may further include a memory 920. The processor 910 can invoke and execute a computer program from the memory 920 to implement the method in the embodiment of the present disclosure.

The memory 920 may be a separate device independent from the processor 910, or may be integrated in the processor 910.

Optionally, the apparatus 900 may further include an input interface 930. The processor 910 can control the input interface 930 to communicate with other devices or chips, and in particular, obtain information or data transmitted by other devices or chips.

Optionally, the apparatus 900 may further include an output interface 940. The processor 910 can control the output interface 940 to communicate with other devices or chips, and in particular, output information or data to other devices or chips.

Optionally, the apparatus can be applied to the network device in the embodiment of the present disclosure, and the apparatus can implement the corresponding processes implemented by the network device in the various methods of the embodiments of the present disclosure. For the sake of brevity, details thereof will be omitted here.

Optionally, the apparatus can be applied to the mobile terminal/terminal device in the embodiment of the present disclosure, and the apparatus can implement the corresponding process implemented by the mobile terminal/terminal device in each method according to the embodiment of the present disclosure. For the sake of brevity, details thereof will be omitted here.

Optionally, the apparatus in the embodiment of the present disclosure may be a chip, and the chip may also be referred to as a system-level chip, a system-chip, a chip system, or a system-on-chip.

Figure 25:
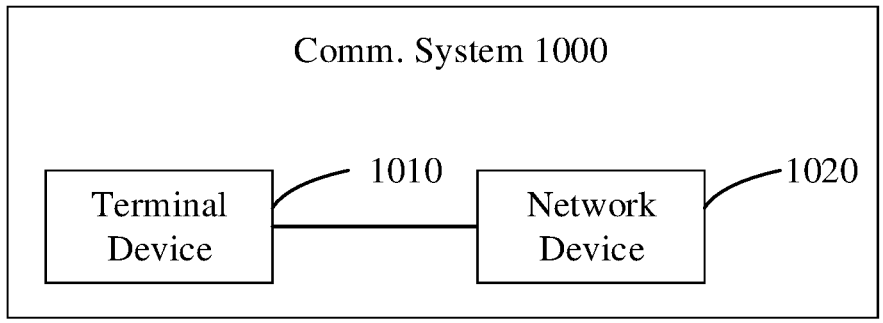
FIG. 25 is a schematic block diagram of a communication system 1000 according to an embodiment of the present disclosure.

FIG. 25 is a schematic block diagram showing a communication system 1000 according to an embodiment of the present disclosure. As shown in FIG. 25, the communication system 1000 includes a terminal device 1010 and a network device 1020.

Here, the terminal device 1010 can be configured to implement the corresponding functions implemented by the terminal device in the above method, and the network device 1020 can be configured to implement the corresponding functions implemented by the network device in the above method. For the sake of brevity, details thereof will be omitted here.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a volatile memory or a non-volatile memory, or may include both volatile and non-volatile memories. Here, the non-volatile memory may be a Read-Only Memory (ROM), a Programmable ROM (PROM), an Erasable PROM (EPROM), an Electrically EPROM (EEPROM), or a flash memory. The volatile memory may be a Random Access Memory (RAM), which is used as an external cache. As illustrative, rather than limiting, examples, many forms of RAMs are available, including Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer readable storage medium for storing a computer program.

Optionally, the computer readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of the present disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer readable storage medium. Based on this understanding, all or part of the technical solutions according to the embodiments of the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include a Universal Serial Bus flash drive, a mobile hard disk, a Read-Only Memory (ROM), a Random Access Memory (RAM), a magnetic disk, an optical disc, or any other medium capable of storing program codes.

While the specific embodiments of the present disclosure have been described above, the scope of the present disclosure is not limited to these embodiments. Various variants and alternatives can be made by those skilled in the art without departing from the scope of the present disclosure. These variants and alternatives are to be encompassed by the scope of present disclosure as defined by the claims as attached.

What is claimed is:

1. A wireless communication method, comprising:
obtaining, by a terminal device, time-domain relative positions and frequency-domain relative positions of a reference signal on repetitive transmissions of a data channel in a time slot,
wherein the time-domain relative positions and/or the frequency-domain relative positions of the reference signal on at least two transmissions in the repetitive transmissions are different,
there is a front loaded DMRS and/or an additional DMRS on at least one of the at least two transmissions, and there is no front loaded DMRS and/or no additional DMRS in at least one of the at least two transmissions.

2. The method according to claim 1, wherein:
the time-domain relative positions of the front loaded DMRS on the at least two transmissions are different;
the time-domain relative positions of the front loaded DMRS on the at least two transmissions are different, and the time-domain relative positions of the additional DMRS on the at least two transmissions are same;
the time-domain relative positions of the front loaded DMRS on the at least two transmissions are same, and the time-domain relative positions of the additional DMRS on the at least two transmissions are different;
the time-domain relative positions of the front loaded DMRS on the at least two transmissions are different, and the time-domain relative positions of the additional DMRS on the at least two transmissions are different;
the time-domain relative positions of the front loaded DMRS in the at least two transmissions are same, there is an additional DMRS in at least one of the at least two transmissions, and there is no additional DMRS in at least one of the at least two transmissions; or
the time-domain relative positions of the front loaded DMRS in the at least two transmissions are different, there is an additional DMRS in at least one of the at least two transmissions, and there is no additional DMRS in at least one of the at least two transmissions.

3. The method according to claim 1, wherein:
the frequency-domain relative positions of the front loaded DMRS on the at least two transmissions are different;
the frequency-domain relative positions of the front loaded DMRS on the at least two transmissions are different, and the frequency-domain relative positions of the additional DMRS on the at least two transmissions are same;
the frequency-domain relative positions of the front loaded DMRS on the at least two transmissions are same, and the frequency-domain relative positions of the additional DMRS on the at least two transmissions are different;
the frequency-domain relative positions of the front loaded DMRS on the at least two transmissions are different, and the frequency-domain relative positions of the additional DMRS on the at least two transmissions are different;
the frequency-domain relative positions of the front loaded DMRS in the at least two transmissions are same, there is an additional DMRS in at least one of the at least two transmissions, and there is no additional DMRS in at least one of the at least two transmissions; or
the frequency-domain relative positions of the front loaded DMRS in the at least two transmissions are different, there is an additional DMRS in at least one of the at least two transmissions, and there is no additional DMRS in at least one of the at least two transmissions.

4. The method according to claim 1, wherein:
the time-domain relative positions and/or the frequency-domain relative positions of the reference signal on the repetitive transmissions are determined according to higher layer signaling and/or Downlink Control Information (DCI).

5. The method according to claim 1, wherein:
the time-domain relative position and/or the frequency-domain relative position of the reference signal on a first transmission in the repetitive transmissions is determined according to higher layer signaling and/or Downlink Control Information (DCI), and the time-domain relative positions and/or the frequency-domain relative positions of the reference signal on non-first transmissions in the repetitive transmissions are determined according to a predetermined rule.

6. The method according to claim 1, wherein for each of the repetitive transmissions, the time-domain relative position of the reference signal on the transmission is relative to a time-domain position of the data channel, and the frequency-domain relative position of the reference signal on the transmission is relative to a frequency-domain position of the data channel on the transmission.

7. A wireless communication method, comprising:
obtaining, by a network device, time-domain relative positions and frequency-domain relative positions of a reference signal on repetitive transmissions of a data channel in a time slot,
wherein the time-domain relative positions and/or the frequency-domain relative positions of the reference signal on at least two transmissions in the repetitive transmissions are different,
there is a front loaded DMRS and/or an additional DMRS on at least one of the at least two transmissions, and there is no front loaded DMRS and/or no additional DMRS in at least one of the at least two transmissions.

8. The method according to claim 7, wherein:
the time-domain relative positions of the front loaded DMRS on the at least two transmissions are different;
the time-domain relative positions of the front loaded DMRS on the at least two transmissions are different, and the time-domain relative positions of the additional DMRS on the at least two transmissions are same;
the time-domain relative positions of the front loaded DMRS on the at least two transmissions are same, and the time-domain relative positions of the additional DMRS on the at least two transmissions are different;
the time-domain relative positions of the front loaded DMRS on the at least two transmissions are different, and the time-domain relative positions of the additional DMRS on the at least two transmissions are different;
the time-domain relative positions of the front loaded DMRS in the at least two transmissions are same, there is an additional DMRS in at least one of the at least two transmissions, and there is no additional DMRS in at least one of the at least two transmissions; or
the time-domain relative positions of the front loaded DMRS in the at least two transmissions are different, there is an additional DMRS in at least one of the at least two transmissions, and there is no additional DMRS in at least one of the at least two transmissions.

9. The method according to claim 7, wherein:
the frequency-domain relative positions of the front loaded DMRS on the at least two transmissions are different;

the frequency-domain relative positions of the front loaded DMRS on the at least two transmissions are different, and the frequency-domain relative positions of the additional DMRS on the at least two transmissions are same;

the frequency-domain relative positions of the front loaded DMRS on the at least two transmissions are same, and the frequency-domain relative positions of the additional DMRS on the at least two transmissions are different;

the frequency-domain relative positions of the front loaded DMRS on the at least two transmissions are different, and the frequency-domain relative positions of the additional DMRS on the at least two transmissions are different;

the frequency-domain relative positions of the front loaded DMRS in the at least two transmissions are same, there is an additional DMRS in at least one of the at least two transmissions, and there is no additional DMRS in at least one of the at least two transmissions; or the frequency-domain relative positions of the front loaded DMRS in the at least two transmissions are different, there is an additional DMRS in at least one of the at least two transmissions, and there is no additional DMRS in at least one of the at least two transmissions.

10. The method according to claim 7, further comprising:
transmitting, by the network device, higher layer signaling and/or Downlink Control Information (DCI) to a terminal device, the higher layer signaling and/or DCI being used to determine the time-domain relative positions and/or the frequency-domain relative positions of the reference signal on the repetitive transmissions.

11. The method according to claim 7, further comprising:
transmitting, by the network device, higher layer signaling and/or Downlink Control Information (DCI) to a terminal device, the higher layer signaling and/or DCI being used to determine the time-domain relative position and/or the frequency-domain relative position of the reference signal on a first transmission in the repetitive transmissions,
the time-domain relative positions and/or the frequency-domain relative positions of the reference signal on non-first transmissions in the repetitive transmissions being determined according to a predetermined rule.

12. The method according to claim 7, wherein for each of the repetitive transmissions, the time-domain relative position of the reference signal on the transmission is relative to a time-domain position of the data channel, and the frequency-domain relative position of the reference signal on the transmission is relative to a frequency-domain position of the data channel on the transmission.

13. A network device, comprising a processor and a memory, wherein the memory is configured to store a computer program, and the processor is configured to invoke and execute the computer program stored in the memory to perform the method according to claim 7.

14. A terminal device, comprising a processor and a memory, wherein the memory is configured to store a computer program, and the processor is configured to invoke and execute the computer program stored in the memory to cause the terminal device to:
obtain time-domain relative positions and frequency-domain relative positions of a reference signal on repetitive transmissions of a data channel in a time slot, wherein the time-domain relative positions and/or the frequency-domain relative positions of the reference signal on at least two transmissions in the repetitive transmissions are different, there is a front loaded DMRS and/or an additional DMRS on at least one of the at least two transmissions, and there is no front loaded DMRS and/or no additional DMRS in at least one of the at least two transmissions.

15. The terminal device according to claim 14, wherein:
the time-domain relative positions of the front loaded DMRS on the at least two transmissions are different;

the time-domain relative positions of the front loaded DMRS on the at least two transmissions are different, and the time-domain relative positions of the additional DMRS on the at least two transmissions are same;

the time-domain relative positions of the front loaded DMRS on the at least two transmissions are same, and the time-domain relative positions of the additional DMRS on the at least two transmissions are different;

the time-domain relative positions of the front loaded DMRS on the at least two transmissions are different, and the time-domain relative positions of the additional DMRS on the at least two transmissions are different;

the time-domain relative positions of the front loaded DMRS in the at least two transmissions are same, there is an additional DMRS in at least one of the at least two transmissions, and there is no additional DMRS in at least one of the at least two transmissions; or the time-domain relative positions of the front loaded DMRS in the at least two transmissions are different, there is an additional DMRS in at least one of the at least two transmissions, and there is no additional DMRS in at least one of the at least two transmissions.

16. The terminal device according to claim 14, wherein:
the frequency-domain relative positions of the front loaded DMRS on the at least two transmissions are different;

the frequency-domain relative positions of the front loaded DMRS on the at least two transmissions are different, and the frequency-domain relative positions of the additional DMRS on the at least two transmissions are same;

the frequency-domain relative positions of the front loaded DMRS on the at least two transmissions are same, and the frequency-domain relative positions of the additional DMRS on the at least two transmissions are different;

the frequency-domain relative positions of the front loaded DMRS on the at least two transmissions are different, and the frequency-domain relative positions of the additional DMRS on the at least two transmissions are different;

the frequency-domain relative positions of the front loaded DMRS in the at least two transmissions are same, there is an additional DMRS in at least one of the at least two transmissions, and there is no additional DMRS in at least one of the at least two transmissions; or the frequency-domain relative positions of the front loaded DMRS in the at least two transmissions are different, there is an additional DMRS in at least one of the at least two transmissions, and there is no additional DMRS in at least one of the at least two transmissions.

* * * * *